(12) United States Patent
Ueno et al.

(10) Patent No.: US 9,013,475 B2
(45) Date of Patent: Apr. 21, 2015

(54) DISPLAY DEVICE, CONTROL SYSTEM, AND STORAGE MEDIUM STORING CONTROL PROGRAM

(75) Inventors: Yasuhiro Ueno, Yokohama (JP); Shigeki Tanabe, Yokohama (JP)

(73) Assignee: Kyocera Corporation, Kyoto (JP)

( * ) Notice: Subject to any disclaimer, the term of this patent is extended or adjusted under 35 U.S.C. 154(b) by 240 days.

(21) Appl. No.: 13/557,409

(22) Filed: Jul. 25, 2012

(65) Prior Publication Data

US 2013/0027395 A1 Jan. 31, 2013

(30) Foreign Application Priority Data

Jul. 27, 2011 (JP) ................................. 2011-164737

(51) Int. Cl.
| | | |
|---|---|---|
| G06T 15/00 | (2011.01) | |
| G06T 15/50 | (2011.01) | |
| G06T 13/00 | (2011.01) | |
| G06F 3/033 | (2013.01) | |
| G06F 3/041 | (2006.01) | |
| G06F 3/048 | (2013.01) | |
| G06F 3/0481 | (2013.01) | |
| G06T 19/00 | (2011.01) | |
| G06F 3/01 | (2006.01) | |
| G06F 3/0483 | (2013.01) | |
| G06F 3/0488 | (2013.01) | |

(52) U.S. Cl.
CPC .......... *G06F 3/04815* (2013.01); *G06T 19/006* (2013.01); *G06F 3/017* (2013.01); *G06F 3/0483* (2013.01); *G06F 3/04883* (2013.01)

(58) Field of Classification Search
CPC .......... G06F 3/017; G06F 3/013; G06F 3/011; G06F 3/041; G06F 3/0483; G06F 3/04815; G06F 3/0488; G06T 13/20; G06T 15/00; G06T 15/20; G06T 19/00
See application file for complete search history.

(56) References Cited

U.S. PATENT DOCUMENTS

| | | | |
|---|---|---|---|
| 2006/0133664 A1* | 6/2006 | Hong et al. | 382/154 |
| 2011/0093778 A1* | 4/2011 | Kim et al. | 715/702 |
| 2013/0016102 A1* | 1/2013 | Look et al. | 345/426 |

FOREIGN PATENT DOCUMENTS

| | | |
|---|---|---|
| JP | 7-319899 A | 12/1995 |
| JP | 2004-318400 A | 11/2004 |
| JP | 2006-134330 A | 5/2006 |
| JP | 2011095547 A | 5/2011 |

OTHER PUBLICATIONS

Office Action mailed Nov. 11, 2014, corresponding to Japanese patent application No. 2011-164737.

* cited by examiner

*Primary Examiner* — Tize Ma
(74) *Attorney, Agent, or Firm* — Lowe Hauptman & Ham LLP

(57) ABSTRACT

According to an aspect, a display device includes a display unit, a detecting unit, and a control unit. The display unit displays a publication. The detecting unit detects an object that performs an operation of turning a page of the publication. The control unit causes the display unit to display a display object associated with a page, of pages of the publication, to be displayed according to the operation detected by the detecting unit.

5 Claims, 33 Drawing Sheets

FIG.3

```xml
<book>
 <frontCover>
   <thickness>1.0 mm</thickness>
   <width>150.0 mm</width>
   <height>240.0 mm</height>
   <color>Blue</color>
   <content>...</content>
 </frontCover>
 <backCover>
   ...
 </backCover>
 <spineCover>
   ...
 </spineCover>

<thickness>0.01mm</thickness>
   <width>148.0mm</width>
   <height>236.0mm</height>
   <color>White</color>
   <item pageNumber="1">
     <content>...</content>
   </item>
   <item pageNumber="2">
     <content>...</content>
     <folded />
   </item>
   ...
   <item pageNumber="37">
     <content>...</content>
     <bookmark />
   </item>
   ...

</book>
```

FIG.4

| 3D Object | Status | | Moving Direction | Moving Range | Moving Speed | Rigidity | Process |
|---|---|---|---|---|---|---|---|
| Page (Book) | Upon release | | Opening/closing direction of book (Rotating direction around a bound portion of pages as a rotation axis) | Go across the bound portion of pages | * | * | Turn pinched page(s) |
| | | | | Not go across the bound portion of pages | High | High | Turn pinched page(s) |
| | | | | Not go across the bound portion of pages | High | Low | Change pinched page(s) according to gravity |
| | | | | Not go across the bound portion of pages | Low | * | Change pinched page(s) according to gravity |
| | During movement | | Direction in which a distance to the bound portion of pages is changed | Distance between a pinched portion and the bound portion of pages is initial distance or less | * | High | Change a pinched portion |
| | | | | Distance between a pinched portion and the bound portion of pages is initial distance or less | * | Low | Deform pinched page(s) accordingly |
| | | | | Distance between a pinched portion and the bound portion of pages is larger than the initial distance | * | High | Change a pinched portion |
| | | | | Distance between a pinched portion and the bound portion of pages is larger than the initial distance | * | Low | Separate pinched page(s) from the book |
| | | | Direction perpendicular to the opening/closing direction of book | * | * | High | Change a pinched portion |
| | | | Direction perpendicular to the opening/closing direction of book | * | * | Low | Separate pinched page(s) from the book |
| | | | Opening/closing direction of book | * | * | Nothing | Deform pinched page(s) accordingly |
| | ... | | ... | ... | ... | ... | ... |
| ... | | | | | | | |

DISPLAY DEVICE, CONTROL SYSTEM, AND STORAGE MEDIUM STORING CONTROL PROGRAM

CROSS-REFERENCE TO RELATED APPLICATIONS

This application claims priority from Japanese Application No. 2011-164737, filed on Jul. 27, 2011, the content of which is incorporated by reference herein in its entirety.

BACKGROUND

1. Technical Field

The present disclosure relates to a display device, a control system, and a storage medium storing a control program.

2. Description of the Related Art

Some display devices with a display unit such as mobile phones can stereoscopically display an image and so on (see e.g., Japanese Patent Application Laid-open No. 2011-95547). The stereoscopic display is implemented by using binocular disparity.

Although the stereoscopic display is a user-friendly display form, it is used only for a viewing purpose and is not used to enhance operation convenience in the conventional display devices.

For the foregoing reasons, there is a need for a display device, a control system, and a control program that provide a user-friendly operation method.

SUMMARY

According to an aspect, a display device includes a display unit, a detecting unit, and a control unit. The display unit displays a publication. The detecting unit detects an object that performs an operation of turning a page of the publication. The control unit causes the display unit to display a display object associated with a page, of pages of the publication, to be displayed according to the operation detected by the detecting unit.

According to another aspect, a control system includes a terminal and a control unit. The terminal includes: a display unit for displaying a publication; and a detecting unit for detecting an object that performs an operation of turning a page of the publication. The control unit causes the display unit to display a display object associated with a page, of pages of the publication, to be displayed according to the operation detected by the detecting unit.

According to another aspect, a non-transitory storage medium stores therein a control program. When executed by a display device which includes a display unit, the control program causes the display device to execute: displaying a publication on the display unit; detecting an object that performs an operation of turning a page of the publication; and causing the display unit to display a display object associated with a page, of pages of the publication, to be displayed according to the operation detected by the detecting.

BRIEF DESCRIPTION OF THE DRAWINGS

FIG. 3 is a diagram illustrating an example of information stored in object data;

FIG. 4 is a diagram illustrating an example of information stored in action data;

DETAILED DESCRIPTION

Exemplary embodiments of the present invention will be explained in detail below with reference to the accompanying drawings. It should be noted that the present invention is not limited by the following explanation. In addition, this disclosure encompasses not only the components specifically described in the explanation below, but also those which would be apparent to persons ordinarily skilled in the art, upon reading this disclosure, as being interchangeable with or equivalent to the specifically described components.

In the following description, a mobile phone is used to explain as an example of the display device; however, the present invention is not limited to mobile phones. Therefore, the present invention can be applied to a variety of devices, including but not limited to personal handyphone systems (PHS), personal digital assistants (FDA), portable navigation units, personal computers (including but not limited to tablet computers, netbooks etc.), media players, portable electronic reading devices, and gaming devices. The present invention can also be applied to stationary electronic devices that have a plurality of display units.

Figure 1:
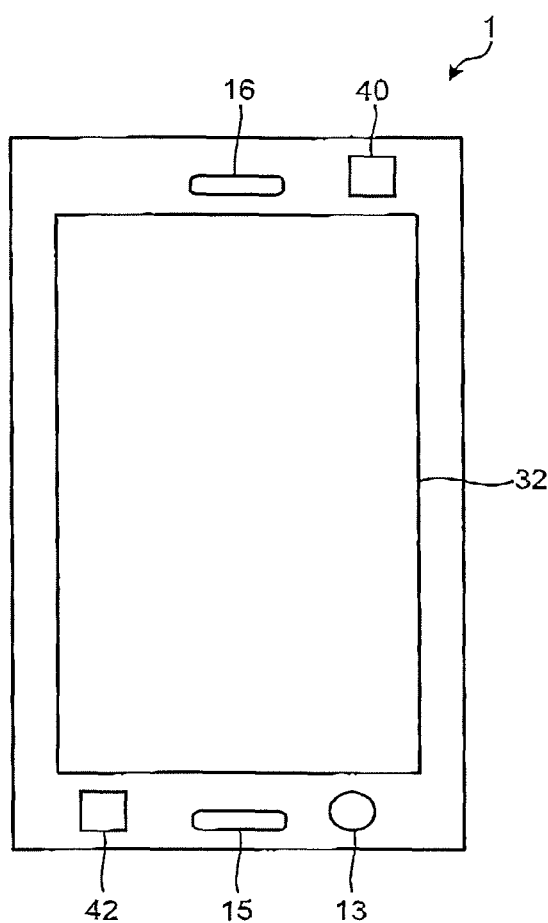
FIG. 1 is a front view of a mobile phone.
Figure 2:
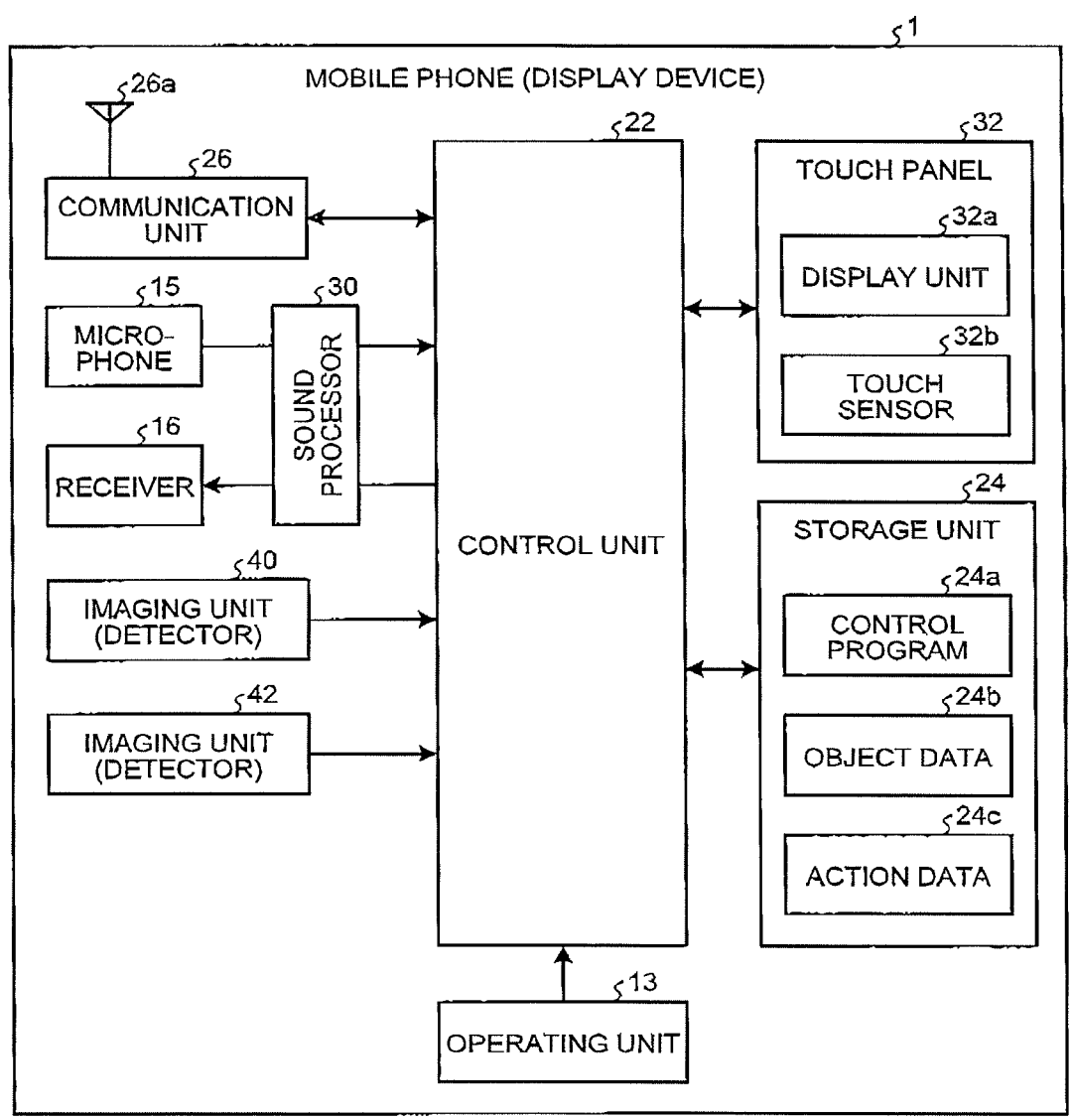
FIG. 2 is a block diagram of the mobile phone.

First of all, a configuration of a mobile phone (display device) 1 according to a present embodiment is explained below with reference to FIG. 1 and FIG. 2. FIG. 1 is a front view of the mobile phone 1. FIG. 2 is a block diagram of the mobile phone 1.

As illustrated in FIG. 1 and FIG. 2, the mobile phone 1 includes an operating unit 13, a microphone 15, a receiver 16, a control unit 22, a storage unit 24, a communication unit 26, a sound processor 30, a touch panel 32, an imaging unit 40, and an imaging unit 42. The operating unit 13, the microphone 15, the receiver 16, the touch panel 32, the imaging unit 40, and the imaging unit 42 are exposed to the front surface of the mobile phone 1.

The operating unit 13 has physical buttons, and outputs a signal corresponding to a pressed button to the control unit 22. In the example illustrated in FIG. 1, the operating unit 13 has only one button, however, may have a plurality of buttons.

The microphone 15 acquires an external sound. The receiver 16 outputs a voice of a call partner during a phone call. The sound processor 30 converts a sound input from the microphone 15 to a digital signal and outputs the digital signal to the control unit 22. The sound processor 30 also decodes a digital signal input from the control unit 22 and outputs the decoded signal to the receiver 16.

The communication unit 26 includes an antenna 26a, and establishes a wireless signal path using a code-division multiple access (CDMA) system, or any other wireless communication protocols, with a base station via a channel allocated by the base station, and performs telephone communication and information communication with the base station. Any other wired or wireless communication or network interfaces, e.g., LAN, Bluetooth, Wi-Fi, NFC (Near Field Communication) may also be included in lieu of or in addition to the communication unit 26.

The touch panel 32 displays various pieces of information such as characters, graphics, and images, and detects an input operation performed for a display area such as icon, button, and character input area. The touch panel 32 is structured with a display unit 32a and a touch sensor 32b so as to overlap each other.

The display unit 32a includes a display device such as a liquid crystal display (LCD) or an organic electro-luminescence display (OELD) panel, and displays various pieces of information according to a control signal input from the control unit 22. The touch sensor 32b detects an input operation performed for the surface of the touch panel 32, and outputs a signal corresponding to the detected input operation to the control unit 22. The detection method in which the touch sensor 32b detects various operations may be any detection method, such as a capacitive type detection method, a resistive type detection method, and a pressure sensitive type detection method.

The touch panel 32 can display a three-dimensional object. A "three-dimensional object" is a display object such as an image and a shape created so as to look as if the display object is three-dimensional using disparity. The method of displaying the three-dimensional object may be a method of realizing a stereoscopic vision using a tool such as glasses, or may be a method of realizing a stereoscopic vision with the naked eye.

The imaging units 40 and 42 electronically photograph images using an image sensor such as a charge-coupled device (CCD) image sensor or a complementary metal oxide semiconductor (CMOS) image sensor. Each of the imaging units 40 and 42 converts the photographed image to a signal and outputs the signal to the control unit 22. The imaging units 40 and 42 also function as a detector that detects objects for operating a three-dimensional object in a space in which the three-dimensional object is stereoscopically displayed (hereinafter, also referred to "three-dimensional space").

The imaging units 40 and 42 are configured to set a field angle and layout so that, even if an object such as a finger is located in any part of the three-dimensional space, the object can be photographed. The imaging units 40 and 42 may be a device that acquires an image of visible light or may be a device that acquires an image of invisible light such as infrared rays.

The control unit 22 includes a central processing unit (CPU) being a processing unit and a memory being a storage unit, and implements various functions by executing programs using these hardware resources. Specifically, the control unit 22 reads a program or data stored in the storage unit 24 to load it to the memory, and causes the CPU to execute instructions contained in the program loaded to the memory. The control unit 22 performs read/write of data from/to the memory and the storage unit 24 and controls operations of the communication unit 26, the display unit 32a, and the like according to execution results of the instructions executed by the CPU. When the CPU executes instructions, the data loaded to the memory and the signal input from the touch sensor 32b or so are used as part of parameters and determination conditions.

The storage unit 24 includes one or more non-transitory storage medium, for example, a nonvolatile memory (such as ROM, EPROM, flash card etc.) and/or a storage device (such as magnetic storage device, optical storage device, solid-state storage device etc.), and stores therein various programs and data. Examples of the program stored in the storage unit 24 include a control program 24a. Examples of the data stored in the storage unit 24 include object data 24b and action data 24c. The storage unit 24 may include a combination of a portable storage medium such as a memory card and a reader/writer for reading/writing data from/to the storage medium. In this case, the control program 24a, the object data 24b, and the action data 24c may be previously stored in the storage medium. The control program 24a, the object data 24b, and the action data 24c may also be acquired from any other device such as a server through communication by the communication unit 26.

The control program 24a provides functions for various controls to operate the mobile phone 1. The function provided by the control program 24a includes a function for controlling a display of a three-dimensional object on the touch panel 32 and a function for detecting a user's operation performed for the three-dimensional object displayed by the touch panel 32. The control program 24a controls a display of a three-dimensional object and detects an operation performed for a three-dimensional object in the above manner, and this enables the user to browse electronic publications such as books in the three-dimensional space, which is explained later.

The object data 24b contains information for shapes and properties of three-dimensional objects. The object data 24b is used to display a three-dimensional object. The action data 24c contains information for how an operation performed for a displayed three-dimensional object acts on the three-dimensional object. When the operation performed for the displayed three-dimensional object is detected, the action data 24c is used to change the three-dimensional object according to the detected operation. The change mentioned here includes movement, rotation, deformation, deletion, and so on.

FIG. 3 is a diagram illustrating an example of information stored in the object data 24b. The example illustrated in FIG. 3 represents information for a three-dimensional object displayed as a book. As illustrated in FIG. 3, the three-dimensional object displayed as the book includes a plurality of three-dimensional objects such as a front cover, a back cover, a spine cover, and a plurality of pages. That is, the three-dimensional object displayed as the book is an aggregation of the three-dimensional objects. In the following explanation, to simplify the explanation, the three-dimensional object displayed as the book may be simply called "book". Similarly, the three-dimensional objects corresponding to the front cover, the back cover, the spine cover, and the pages may be simply called "front cover", "back cover", "spine cover", and "pages", respectively.

Previously set in the front cover, the back cover, and the spine cover is information for specifying respective external appearances such as thickness, width, height, and color, and respective properties. Set also in the front cover, the back cover, and the spine cover are a character string, an image, and so on to be displayed on the surface of a three-dimensional object as contents in a predetermined form.

Previously and commonly set in the pages is information for specifying an external appearance such as thickness, width, height, and color, and properties. Set also in the pages are text, an image, and so on to be displayed in the respective pages as contents in a predetermined form for each page. Information specific to a particular page such as "<folded/>" and "<bookmark/>" may be added thereto. The information of "<folded/>" indicates that part of a corresponding page is folded. The information of "<bookmark/>" indicates that a bookmark is placed between corresponding pages.

FIG. 3 represents an example of describing the object data 24b in the form of Extensible Markup Language (XML); however, the form of the object data 24b is not limited thereto. For example, the form of the object data 24b may be a specifically designed form. The configuration of a three-dimensional object displayed as a book is not limited to the example illustrated in FIG. 3. For example, the three-dimensional object displayed as a book does not necessarily include information for specifying respective shapes and properties of the front cover, the back cover, and the spine cover. In this case, front covers, back covers, and spine covers of all books may have common shape and properties according to previously performed settings.

FIG. 4 is a diagram illustrating an example of information stored in the action data 24c. The example illustrated in FIG. 4 indicates how operations performed for pages contained in a book are acted on the pages. In the present embodiment, an operation performed for a page is assumed to be an operation performed with a part of the page pinched by fingers or so.

As illustrated in FIG. 4, the action of the operation performed for the page changes according to conditions such as a status, a moving direction, a moving range, a moving speed, and rigidity. The status indicates either "upon release", that is, a time when a pinching operation is completed, or "during movement", that is, during a pinching operation. The moving direction is a direction in which the fingers or so pinching a page are moving. The moving range is a range in which the fingers or so pinching a page are moving. The moving speed is a speed at which the fingers or so pinching a page are moving. The rigidity indicates hardness of a page. The rigidity may be determined based on a thickness of the page.

It is assumed that the status is "upon release" and a previous moving direction of the fingers or so pinching page(s) is an opening/closing direction of a book, that is, a rotating direction of the fingers around a bound portion of pages as a rotation axis. In this case, when the moving range of the fingers or so goes across the bound portion of pages, that is, when the fingers or so go across the bound portion of pages, the mobile phone 1 changes the pinched page(s) as if they are turned over. When the moving speed is higher than a threshold and the rigidity is higher than a threshold even if the moving range of the fingers or so does not go across the bound portion of pages, the mobile phone 1 also changes the pinched page(s) as if they are turned over. When the moving range of the fingers or so does not go across the bound portion of pages and if the moving speed is lower than the threshold or the rigidity is lower than the threshold, the mobile phone 1 changes the pinched page(s) according to gravity. The change according to gravity is expressed as, for example, a drop in the gravity direction.

It is assumed that the status is "during movement" and a moving direction of the fingers or so pinching page(s) is a direction in which a distance to the bound portion of pages changes. In this case, if the rigidity is higher than the threshold, the mobile phone 1 changes a pinched position. When the rigidity is lower than the threshold and if a distance between the pinched portion and the bound portion of pages is an initial distance or less, the mobile phone 1 changes the pinched page(s) in response to moves of the fingers or so. When the rigidity of a page is lower than the threshold and if a distance between the pinched portion and the bound portion of pages is larger than the initial distance, the mobile phone 1 changes the pinched page(s) as if they are cut off. That is, the mobile phone 1 separates the pinched page(s) from the book.

When the moving direction of the fingers or so pinching page(s) is a direction perpendicular to the opening/closing direction of the book and if the rigidity of the page is higher than the threshold, the mobile phone 1 changes a pinched position. When the moving direction of the fingers or so pinching a page is a direction perpendicular to the opening/closing direction of the book and if the rigidity of the page is lower than the threshold, the mobile phone 1 changes the pinched page(s) as if they are cut off. When the moving direction of the fingers or so pinching page(s) is the opening/closing direction of the book, the mobile phone 1 changes the pinched page(s) in response to moves of the fingers or so.

In this way the information is set in the action data 24c so that a page changes in the same manner as that of a page of an actual book according to an operation. As for the front cover and the back cover, the setting similar to that of the page is performed in the action data 24c. The structure and the contents of the action data 24c are not limited to the example illustrated in FIG. 4. For example, the action data 24c may contain any condition other than the conditions illustrated in FIG. 4. The actions defined in the action data 24c may be different from the example illustrated in FIG. 4.

Figure 5:
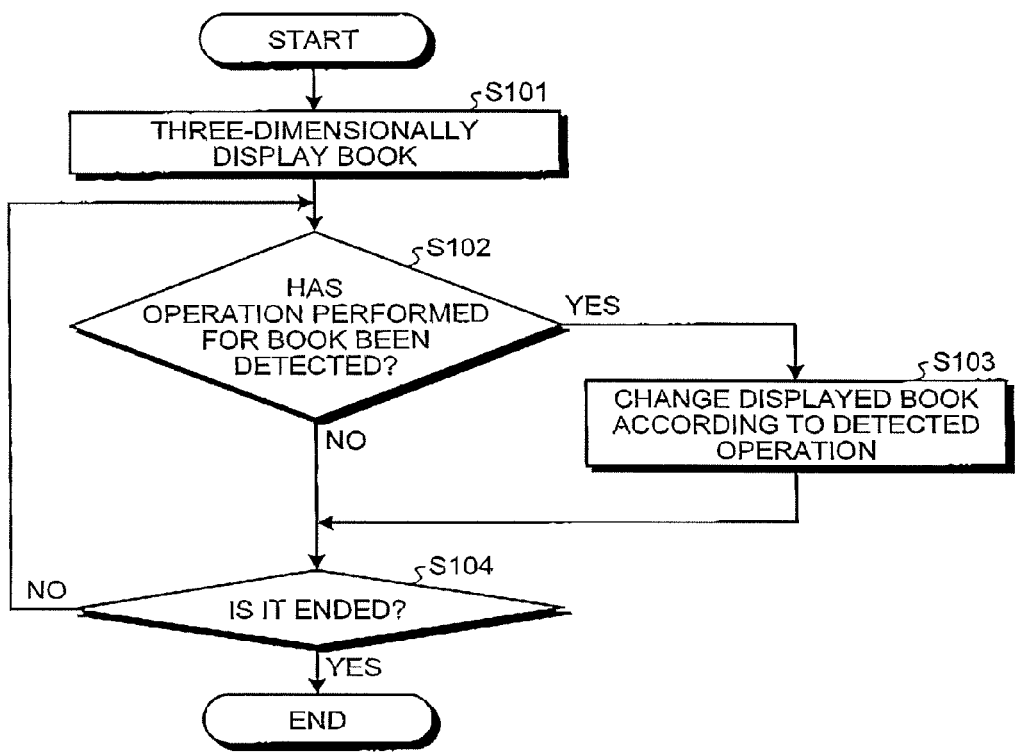
FIG. 5 is a flowchart of a basic procedure for implementing a book browsing function.
Figure 6:
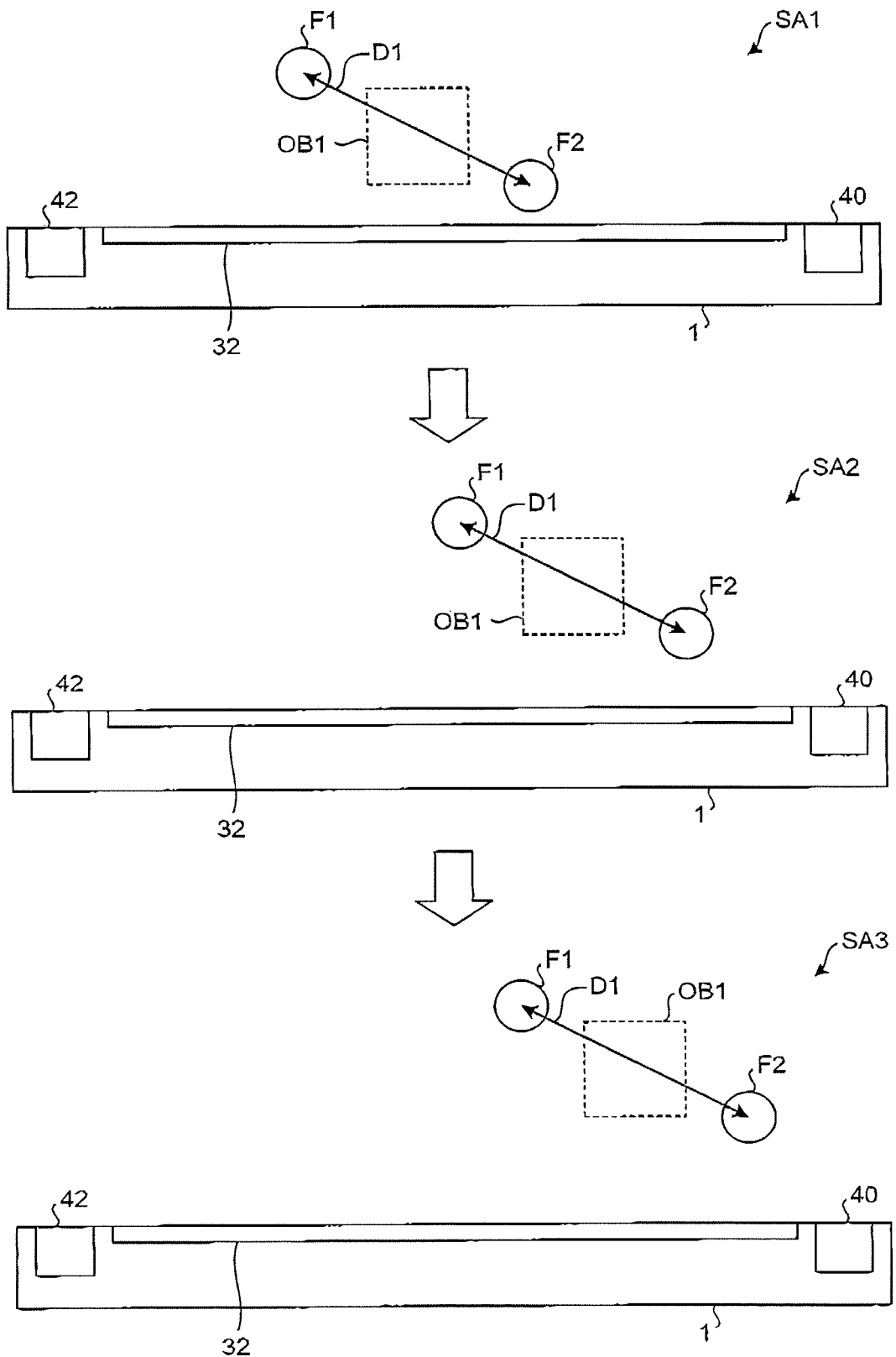
FIG. 6 is a diagram for explaining how to detect an operation performed with a three-dimensional object pinched.
Figure 7:
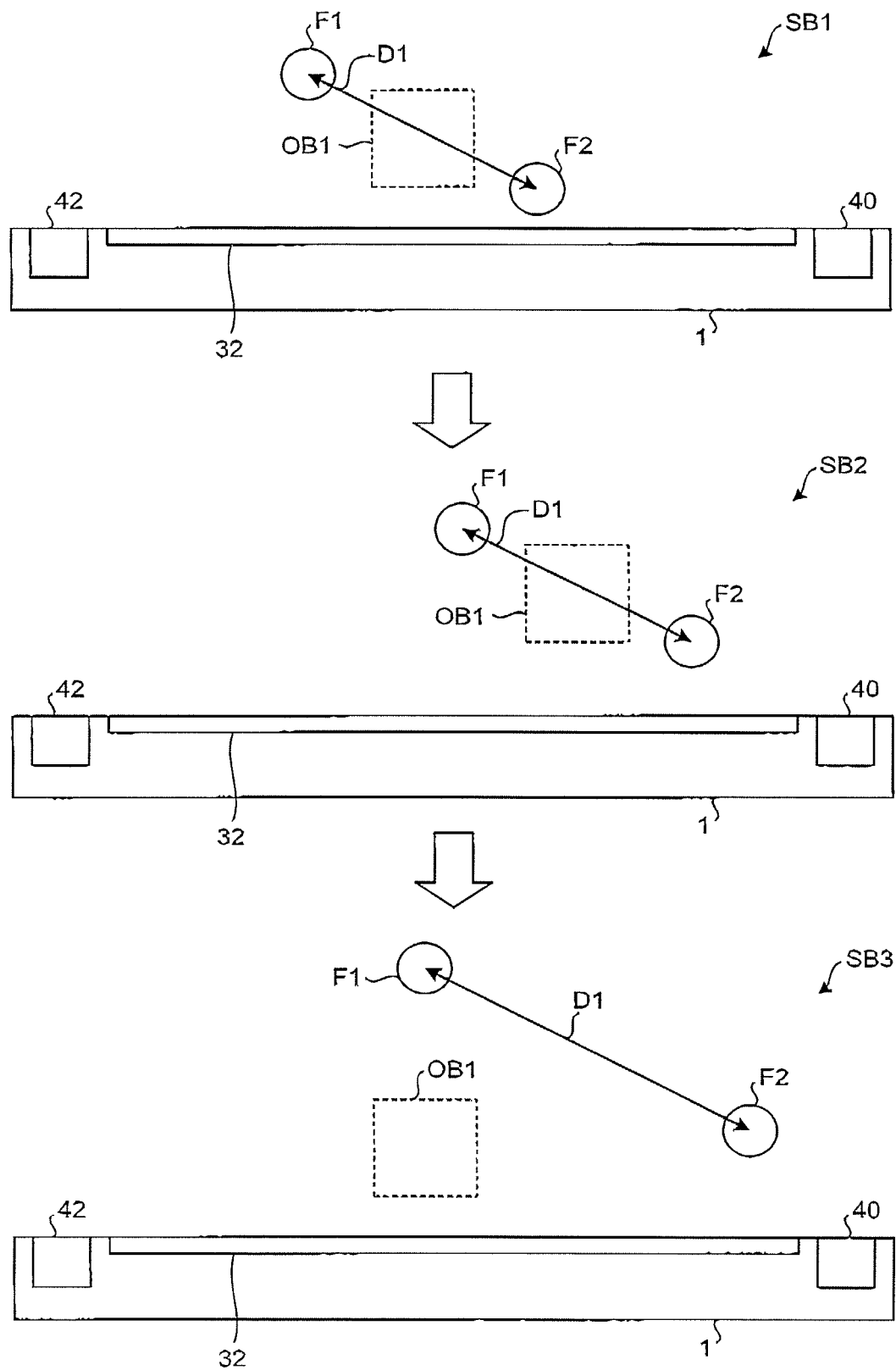
FIG. 7 is a diagram for explaining how to detect an operation performed with the three-dimensional object pinched.
Figure 8:
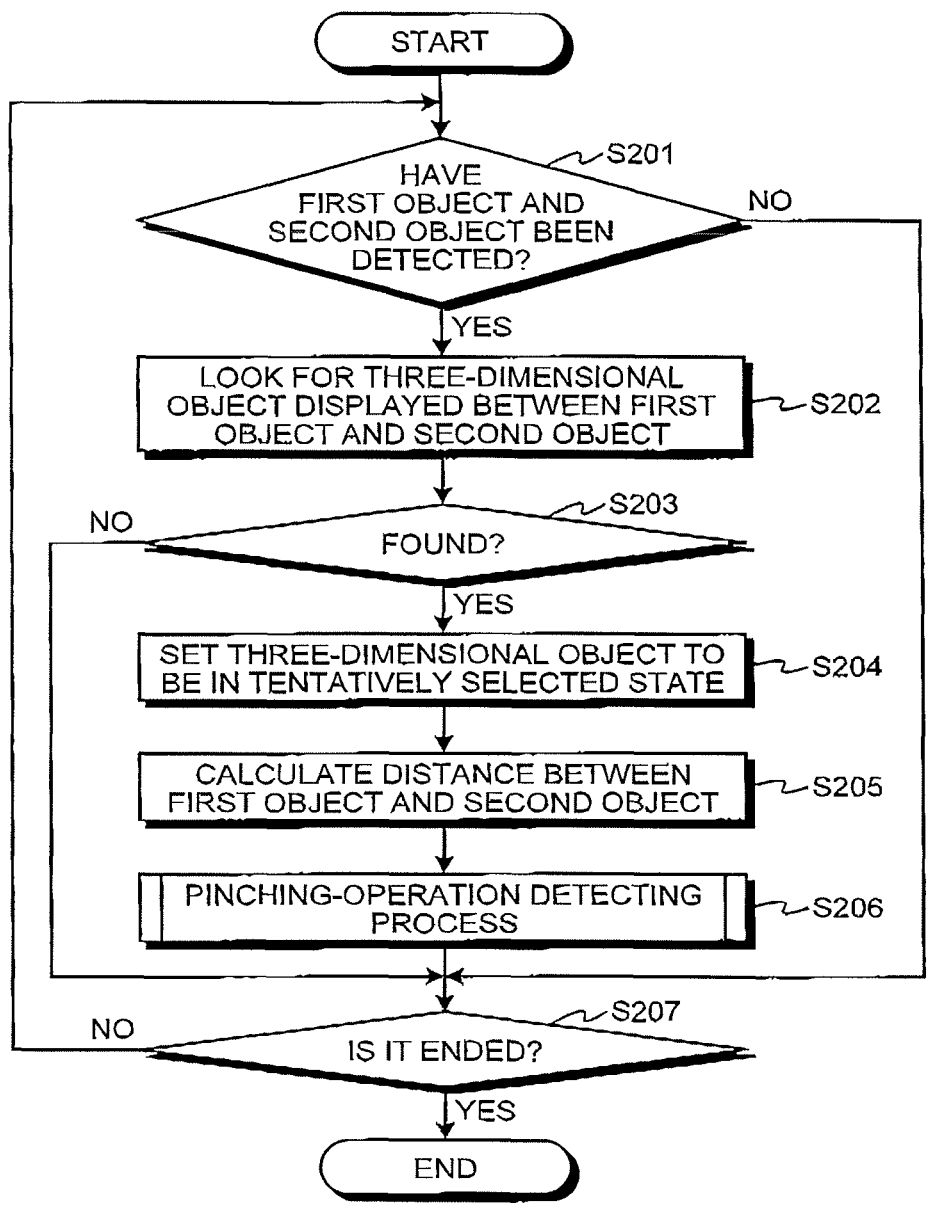
FIG. 8 is a flowchart of a procedure of a selection detecting process of the three-dimensional object.
Figure 9:
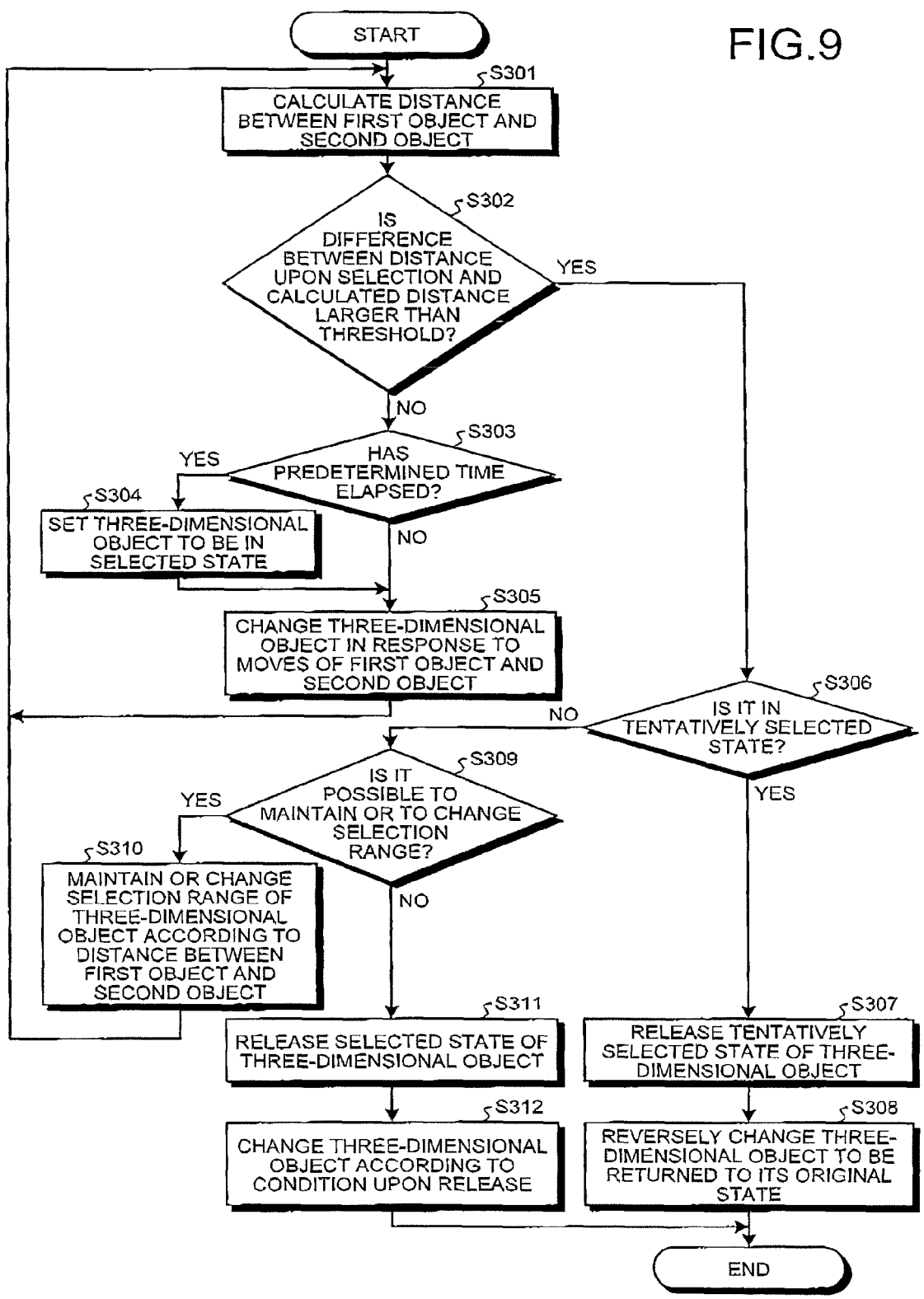
FIG. 9 is a flowchart of a procedure of a pinching-operation detecting process.

Then, an operation performed by the mobile phone 1 in order to implement a book browsing function is explained with reference to FIG. 5 to FIG. 9. FIG. 5 is a flowchart of a basic procedure performed by the mobile electronic device 1 in order to implement a book browsing function. FIG. 6 and FIG. 7 are diagrams for explaining how to detect an operation performed with a three-dimensional object pinched. FIG. 8 is a flowchart of a procedure of a selection detecting process of the three-dimensional object. FIG. 9 is a flowchart of a procedure of a pinching-operation detecting process.

The procedure illustrated in FIG. 5 is implemented by the control unit 22 executing the control program 24a when, for example, a predetermined operation of instructing activation of the book browsing function is detected by the touch panel 32. As illustrated in FIG. 5, to implement the book browsing function, first of all, at Step S101, the control unit 22 three-dimensionally displays a book on the touch panel 32. The external appearance and the contents of the displayed book are determined based on the object data 24b.

Subsequently, at Step S102, the control unit 22 determines whether an operation performed for the book has been detected. The operation performed for the book is detected based on images photographed by the imaging units 40 and 42. When the operation performed for the book has been detected (Yes at Step S102), then at Step S103, the control unit 22 changes the displayed book according to the detected operation. How to change the book according to the detected operation is determined based on the action data 24c. When the operation performed for the book has not been detected (No at Step S102), then the displayed book is kept as it is.

Subsequently, at Step S104, the control unit 22 determines whether the process is ended. For example, when the user performs a predetermined operation of instructing an end of the book browsing function, the control unit 22 determines that the process is ended. When the process is ended (Yes at, Step S104), the control unit 22 completes the procedure illustrated in FIG. 4. When the process is not ended (No at Step S104), the control unit 22 re-executes Step S102 and the subsequent steps.

As explained above, in the present embodiment, the operation performed for the book is assumed to be, fox example, an operation performed with page(s) pinched by the fingers or so. That is, at Step S102 in FIG. 5, an operation performed with page(s) pinched is detected, and at Step S103, a process corresponding to the operation performed with the page(s) pinched is executed.

Detailed control for an operation performed with the page(s) pinched is explained below with reference to FIG. 6 to FIG. 9. At Step SA1 in FIG. 6, the touch panel 32 stereoscopically displays a three-dimensional object OB1 in a three-dimensional space. To select the three-dimensional object OB1, the user moves a finger F1 and a finger F2 so that the three-dimensional object OB1 is located between the finger F1 and the finger F2.

The mobile phone 1 determines positions and actions of objects such as fingers in the three-dimensional space based on images photographed by the imaging units 40 and 42. The mobile phone 1 checks the positions and actions of the determined objects against the shape of the three-dimensional object such as a three-dimensional block displayed in the three-dimensional space and its computational position, to detect an operation performed for the three-dimensional object.

The positions of the objects may be determined based on the sizes of the previously registered objects, the sizes of the objects in the images, and the positions of the objects in the images. Alternatively, the positions of the objects may also be determined by checking the sizes and the positions of the objects in the image photographed by the imaging unit 40 against the sizes and the positions of the objects in the image photographed by the imaging unit 42. The determination as to an action of the objects such as the fingers may be implemented using a known technology. When the object is the finger, the process may be performed by setting a position of the tip of the finger as a position of the object.

The shape of the three-dimensional object is defined in the object data 24b. A computational position of the three-dimensional object in the three-dimensional space is calculated based on a position of the three-dimensional object on the display surface of the touch panel 32 and an amount of "floating" of the three-dimensional object in the three-dimensional space. The amount of floating of the three-dimensional object in the three-dimensional space may be a value determined upon display, or may be a value calculated from a difference between positions of the three-dimensional object in an image for a right eye and in an image for a left eye, which are used to stereoscopically display the three-dimensional object.

When the two objects are detected within the three-dimensional space and the three-dimensional object OB1 is located between the two objects, the mobile phone 1 monitors a change in a distance D1 between the two objects. When the distance D1 is substantially constant for a longer period of time than the predetermined time, the mobile phone 1 determines that the three-dimensional object OB1 has been selected, and sets the three-dimensional object OB1 to be in the selected state. The mobile phone 1 then changes, or so, a display mode of the three-dimensional object OB1 to notify the user that the three-dimensional object OB1 is in the selected state.

The selected state of the three-dimensional object OB1 may be notified to the user by, for example, changing a color or a brightness near a portion, on the surface of the three-dimensional object OB1, intersecting a line connecting the detected two objects. Instead of or in addition to such visual notification, a sound or a vibration may be used to perform the notification.

There is no need for the two objects to remain at the locations where the three-dimensional object OB1 is sandwiched therebetween while the mobile phone 1 is monitoring the change in the distance D1 between the two objects. Namely, the user moves the finger F1 and the finger F2 so that the three-dimensional object OB1 is located between the finger F1 and the finger F2 as illustrated at Step SA1, and thereafter the user may move the finger F1 and the finger F2 to some other locations without keeping the state. For example, the user moves the finger F1 and the finger F2 to a position of a page, which he/she wishes to pinch, so as to be sandwiched therebetween, and thereafter may start an operation of turning the pinched page before the notification that the pinched page is in the selected state.

It is assumed, as illustrated at Step SA2, that the user moves the finger F1 and the finger F2 from the state at Step SA1 while keeping substantially constant the distance D1 therebetween. In this case, the mobile phone 1 applies a change such as movement and rotation to the three-dimensional object OB1 according to the moves of the finger F1 and the finger F2 from the stage when the display of the three-dimensional object OB1 between the finger F1 and the finger F2 is detected, that is, from the stage at Step SA1. Then, as illustrated at Step SA3, the mobile phone 1 sets the three-dimensional object OB1 to be in the selected state at the stage when the state in which the distance D1 between the finger F1 and the finger F2 is kept substantially constant continues for a longer period of time than the predetermined time.

As illustrated at Step SB1 to Step SB3 in FIG. 7, when the distance D1 between the finger F1 and the finger F2 is increased before the predetermined time elapses, the mobile phone 1 applies a reverse change to the change applied thereto so far, to the three-dimensional object OB1. Namely, if the user does not intend to operate the three-dimensional object OB1, the three-dimensional object OB1 is returned to its original state. Consequently, the three-dimensional object OB1 is displayed at the same position as that at the stage at Step SB1 in the same state. The speed of the reverse change applied to the three-dimensional object OB1 may be higher than the speed of the change applied to the three-dimensional object OB1 so far. That is, the three-dimensional object OB1 may be reversely changed as if it is reversely reproduced at a high speed.

In this way, by starting to apply the change to the three-dimensional object from the stage when the display of the three-dimensional object between the two objects is detected, the user can recognize that the three-dimensional object is being selected before the selection is determined. As a result, the user is able to know, at an early point, whether an intended three-dimensional object has been selected. Until the state in which the distance between the two objects is kept substantially constant continues for the a longer period of time than predetermined time, the three-dimensional object with the change applied thereto may be displayed in a mode (e.g., half-transparent mode) different from the normal mode or from the mode in the selected state, so that the user can easily determine the state of the three-dimensional object.

It should be noted that, instead of changing the three-dimensional object OB1 according to the moves of the finger F1 and the finger F2 from the stage at Step SA1, the three-dimensional object OB1 may be started to be changed after the three-dimensional object OB1 is in the selected state. In addition, only when the state, in which the three-dimensional object OB1 is located between the finger F1 and the finger F2 as illustrated at Step SA1, continues for the a longer period of time than predetermined time, the three-dimensional object OB1 may be set to be in the selected state.

FIG. 6 represents the example in which one three-dimensional object displayed between the two objects is selected; however, the number of selected three-dimensional objects is not limited to one. When it is detected that a plurality of three-dimensional objects are displayed between the two objects, the mobile phone 1 collectively selects these three-dimensional objects. That is, the mobile phone 1 allows the user to collectively select a plurality of pages and operate them.

FIG. 8 represents a procedure of a selection detecting process of a three-dimensional object. The procedure illustrated in FIG. 8 is implemented by the control unit 22 executing the control program 24a. As illustrated in FIG. 8, at Step S201, the control unit 22 determines whether the detectors, that is, the imaging units 40 and 42 have detected a first object and a second object. The first object and the second object are, for example, user's fingers.

When the first object and the second object have been detected (Yes at Step S201), then at Step S202, the control unit 22 looks for a three-dimensional object displayed between the first object and the second object, from among displayed three-dimensional objects.

When the three-dimensional object displayed between the first object and the second object has been found (Yes at Step S203), then at Step S204, the control unit 22 sets the three-dimensional object displayed between the first object and the second object to be in a tentatively selected state. When a plurality of three-dimensional objects are displayed between the first object and the second object, the control unit 22 sets all the three-dimensional objects to be in the tentatively selected state. The control unit 22 calculates, at Step S205, a distance between the first object and the second object. At Step S206, the control unit 22 executes the pinching-operation detecting process represented in FIG. 9, and changes, during the execution, the three-dimensional object in the selected state according to the detected operation.

When no three-dimensional object displayed between the first object and the second object is found (No at Step S203), then Step 204 to Step S206 are not executed.

Thereafter, at Step S207, the control unit 22 determines whether the process is ended. When the process is ended (Yes at Step S207), the control unit 22 completes the procedure. When the process is not ended (No at Step S207), the control unit 22 re-executes Step S201 and the subsequent steps.

When the first object and the second object have not been detected (No at Step S201), the control unit 22 executes Step S207.

FIG. 9 represents a procedure of the pinching-operation detecting process. The procedure illustrated in FIG. 9 is implemented by the control unit 22 executing the control program 24a. As illustrated in FIG. 9, first of all, at Step S301, the control unit 22 calculates a distance between the first object and the second object. Then at Step S302, the control unit 22 determines whether a difference between a distance upon selection of a three-dimensional object, that is, at a start time of the pinching-operation detecting process and a distance measured at Step S301 is larger than a threshold. The threshold used in this case is a value used to determine whether the distance between the first object and the second object is substantially the same as that upon selection of the three-dimensional object.

When the difference between the distances is not larger than the threshold (No at Step S302), then at Step S303, the control unit 22 determines whether a predetermined time has elapsed since the start of the pinching-operation detecting process. When the predetermined time has elapsed (Yes at Step S303), then at Step S304, the control unit 22 sets, if there is a three-dimensional object in the tentatively selected state, the three-dimensional object to be in the selected state. When the predetermined time has not elapsed (No at Step S303), the control unit 22 does not execute Step S304. The predetermined time may be a sufficiently short time like, for example, 0.1 second.

Subsequently, at Step S305, the control unit 22 changes the three-dimensional object in the selected state or in the tentatively selected state according to the moves of the detected first object and second object. How to change the three-dimensional object is determined based on the action data 24c. For example, the control unit 22 changes a page of the book in the selected state or in the tentatively selected state as if it is lifted up in response to the moves of the first object and the second object. The control unit 22 then re-executes Step S301 and the subsequent steps.

When the difference between the distances is larger than the threshold (Yes at Step S302), then at Step S306, the control unit 22 determines whether the three-dimensional object displayed between the first object and the second object is in the tentatively selected state.

When the three-dimensional object is in the tentatively selected state (Yes at Step S306), then at Step S307, the control unit 22 releases the tentatively selected state of the three-dimensional object. At Step S308, the control unit 22 reversely changes the three-dimensional object to be returned to its original state. The control unit 22 then ends the pinching-operation detecting process.

When the three-dimensional object is not in the tentatively selected state, that is, is in the selected state (No at Step S306), then at Step S309, the control unit 22 determines whether it is possible to maintain or to change the selection range of the three-dimensional object according to a change in the distance between the first object and the second object.

When the distance between the first object and the second object is reduced, the selection range of the three-dimensional object is maintained or reduced. Specifically, when there is one three-dimensional object in the selected state, even if the distance between the first object and the second object is reduced, the three-dimensional object remains in the selected state. When there are a plurality of three-dimensional objects in the selected state, the number of three-dimensional objects in the selected state is getting smaller as the distance between the first object and the second object is being reduced; however, at least one of the three-dimensional objects remains in the selected state. For example, when some pages of the book are pinched with the fingers, the control unit 22 is reducing the number of the pinched pages as the fingers are approaching each other; however, maintains the state in which at least one page is pinched therewith.

Meanwhile, when the distance between the first object and the second object is increased, the selection range of the three-dimensional object sometimes cannot be maintained or changed. Specifically, when the distance between the first object and the second object is increased so that any three-dimensional object not in the selected state is thereby located between the first object and the second object, the selection range is expanded. In this case, the three-dimensional object not in the selected state is changed to that in the selected state. When there is no more three-dimensional object not in the selected state between the first object and the second object whose distance is increased so that a space between the first object or the second object and the three-dimensional object in the selected state is increased more than a predetermined value, it is not possible to maintain or to change the selection range. When it is determined that it is not possible to maintain or to change the selection range, the three-dimensional object in the selected state is released.

For example, when some pages of the book are pinched with the fingers, the control unit 22 increases the number of pages as the space of the fingers is getting wider. When there is no more page to be pinched and the space between the pinched page and either one of the fingers becomes wider than the predetermined value, then the control unit 22 determines that it is not possible to maintain or to change the selection range.

When it is possible to maintain or to change the selection range of the three-dimensional object in response to the change in the distance between the first object and the second object (Yes at Step S309), then at Step S310, the control unit 22 maintains or changes the selection range of the three-dimensional object in response to the change in the distance between the first object and the second object. The control unit 22 then re-executes Step S301 and the subsequent steps.

When it is not possible to maintain or to change the selection range of the three-dimensional object in response to the change in the distance between the first object and the second object (No at Step S309), then at Step S311, the control unit 22 releases the selected state of the three-dimensional object. At Step S312, the control unit 22 changes the three-dimensional object according to the condition upon the release. How to change the three-dimensional object is determined based on the action data 24c. For example, the control unit 22 changes a page of the book in the selected state as if it is turned over according to the gravity. The control unit 22 then ends the pinching-operation detecting process.

Then, a specific example of control in the book browsing function is explained below with reference to FIG. 10 to FIG. 24. To simplify the explanation, in the following, explanation of the tentatively selected state is omitted.

Figure 10:
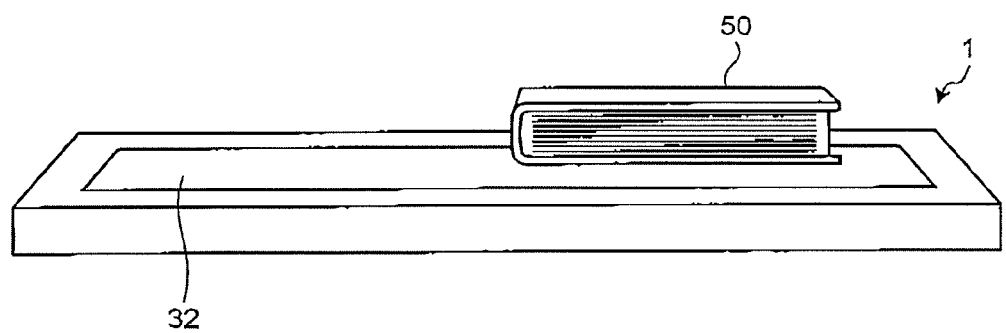
FIG. 10 is a diagram illustrating an example of a closed book.

FIG. 10 is a diagram illustrating an example of a closed book. As illustrated in FIG. 10, the mobile phone 1 stereoscopically displays a book 50 on the touch panel 32. In this example, the book 50 is closed. The appearance of the book 50 is determined based on the object data 24b. If the thickness of the book 50 is smaller than a predetermined value when the book 50 is displayed faithfully to the object data 24b, the mobile phone 1 may correct the thickness of pages so that the thickness of the book 50 becomes the predetermined value or more. The increase in the thickness of the book 50 allows the user to easily perform an operation for the book 50.

Figure 11:
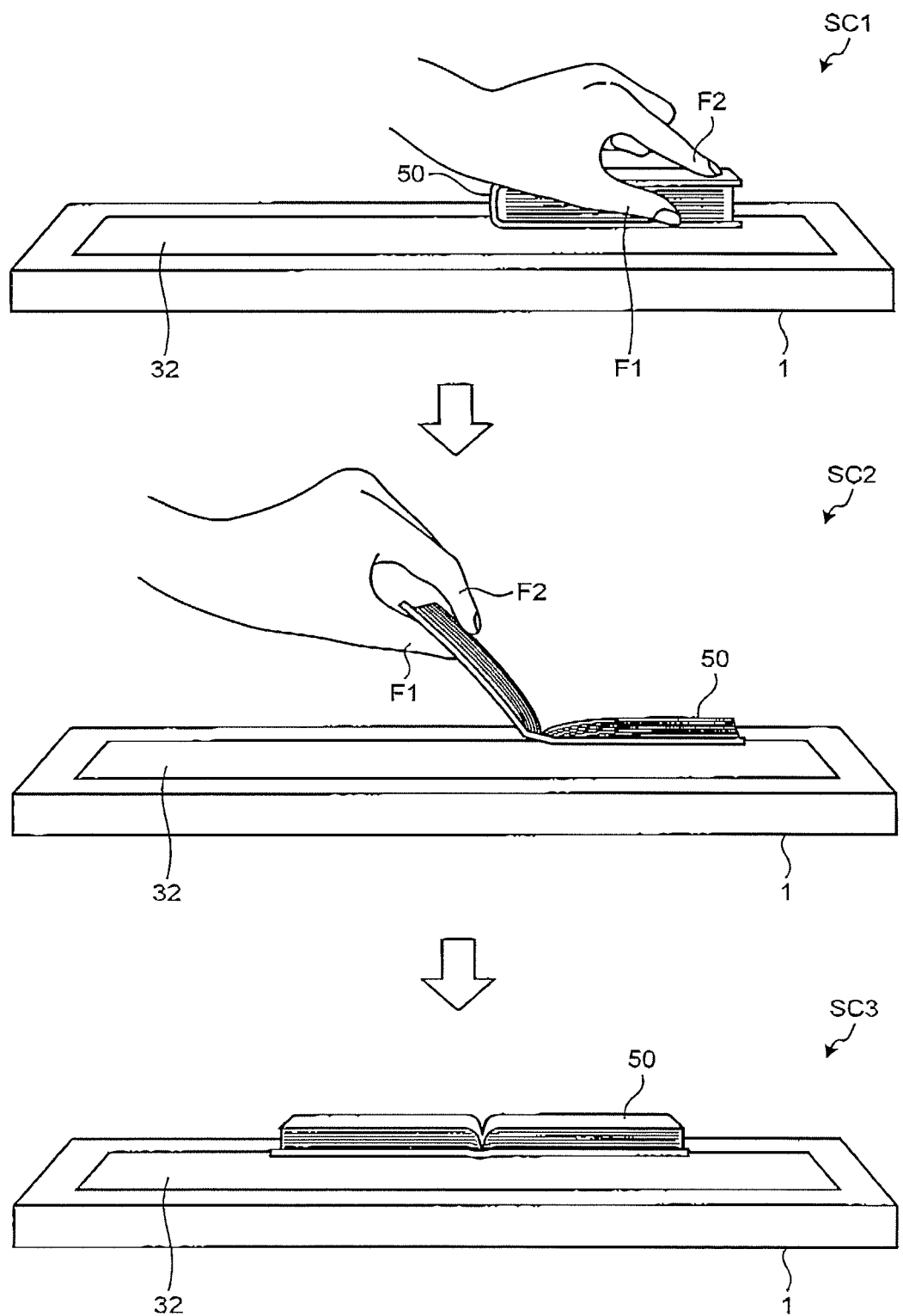
FIG. 11 is a diagram illustrating an example of how to control page turning.

FIG. 11 is a diagram illustrating an example of how to control page turning. At Step SC1 in FIG. 11, the user moves the finger F1 and the finger F2 so that the front cover and some pages of the book 50 are located between the finger F1 and the finger F2. When it is detected that the front cover and the pages are located between the finger F1 and the finger F2, the mobile phone 1 sets the front cover and the pages located between the finger F1 and the finger F2 to be in the selected state.

Thereafter, at Step SC2, the user moves the finger F1 and the finger F2 in the opening/closing direction of the book 50 until they go across the bound portion of the pages while keeping substantially constant the space between the finger F1 and the finger F2. When such actions of the finger F1 and the finger F2 are detected, the mobile phone 1 changes the front cover and the pages in the selected state according to the movement based on the action data 24c. Specifically, the mobile phone 1 changes an angle of the front cover and the pages in the selected state according to the movement of the finger F1 and the finger F2.

When the user increases the distance between the finger F1 and the finger F2 in this state or when the user moves the finger F1 and the finger F2 away from the bound portion of the pages so that the front cover and the pages are not located between the finger F1 and the finger F2, the front cover and the pages in the selected state are released. As a result, the mobile phone 1 changes the book 50 according to the movement based on the action data 24c. Specifically, as illustrated at Step SC3, the book 50 is changed so that the innermost page of the pages in the selected state is the top of the pages. The mobile phone 1 displays a text, an image, and the like, on the surfaces of the open pages of the book 50, corresponding to the pages.

Figure 12:
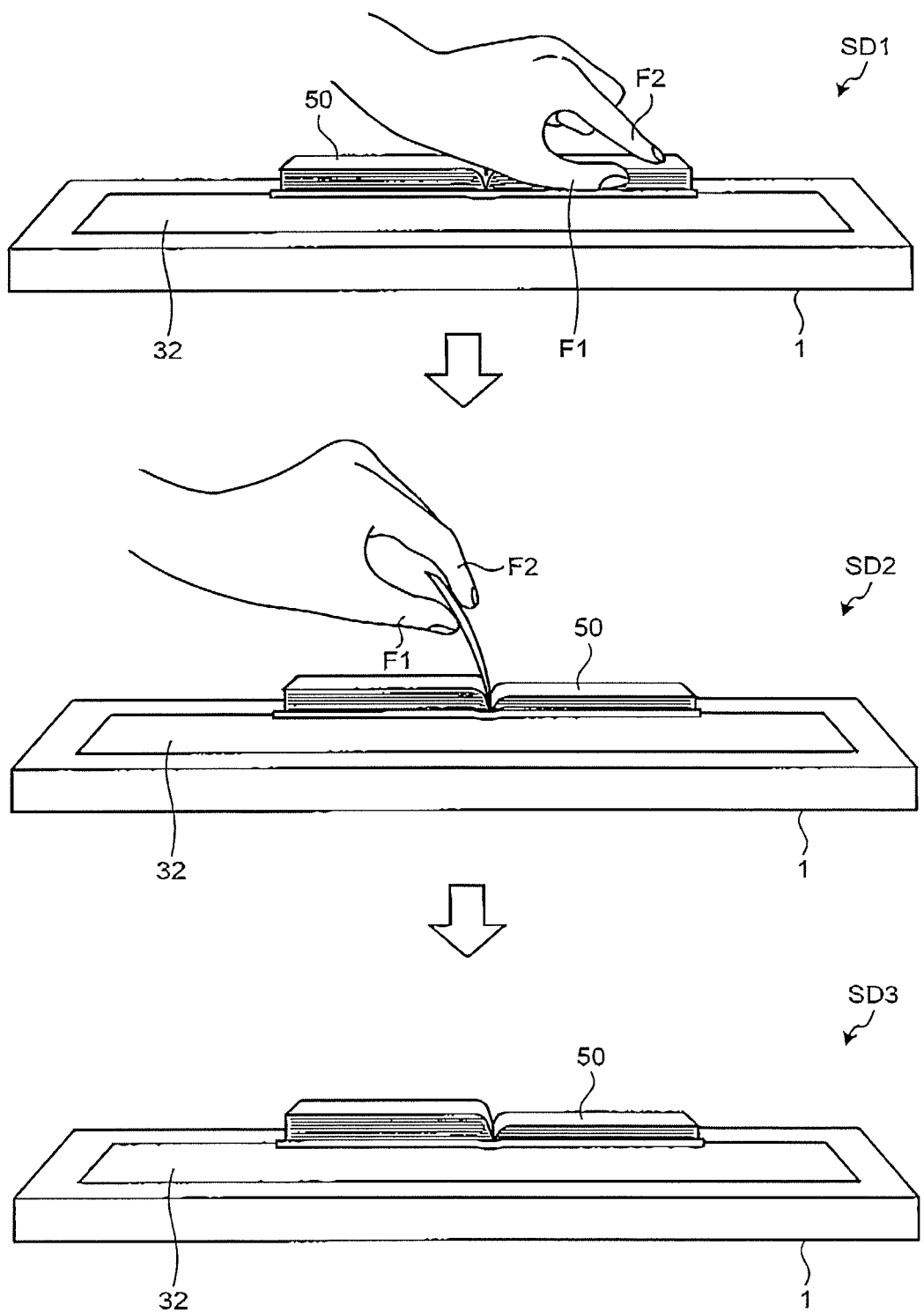
FIG. 12 is a diagram illustrating another example of how to control page turning.

FIG. 12 is a diagram illustrating another example of how to control page turning. At Step SD1 in FIG. 12, the book 50 is displayed in a state of being already open under the control as illustrated in FIG. 11. The user then moves the finger F1 and the finger F2 so that some pages including the open page are located between the finger F1 and the finger F2. When it is detected that the pages are located between the finger F1 and the finger F2, the mobile phone 1 sets the pages located between the finger F1 and the finger F2 to be in the selected state.

Thereafter, at Step SD2, the user moves the finger F1 and the finger F2 in the opening/closing direction of the book 50 until they go across the bound portion of the pages while keeping substantially constant the space between the finger F1 and the finger F2. When such actions of the finger F1 and the finger F2 are detected, the mobile phone 1 changes the pages in the selected state according to the movement based on the action data 24c. Specifically, the mobile phone 1 changes an angle of the pages in the selected state according to the movement of the finger F1 and the finger F2.

At this time, the mobile phone 1 may change the way to change the pages in the selected state according to the thickness (rigidity) of the book. For example, when the pages are thicker than a threshold (when the rigidity is high), the mobile phone 1 may change the angle without bending the pages. In addition, when the pages are thicker than the threshold (when the rigidity is high), the mobile phone 1 may restrict the change of the pages so that the angle of the pages does not change unless the objects pinching the pages in the selected state move so as to describe a circular arc around the bound portion of the pages as a rotation axis. When the pages are thinner than the threshold (when the rigidity is low), the mobile phone 1 may bend the pages according to the move of the objects pinching the pages in the selected state and the gravity.

When the user increases the distance between the finger F1 and the finger F2 in the state at Step SD2 or when the user moves the finger F1 and the finger F2 away from the bound portion of the pages so that the pages are not located between the finger F1 and the finger F2, the pages in the selected state are released. As a result, the mobile phone 1 changes the book 50 according to the movement based on the action data 24c. Specifically, as illustrated at Step SD3, the book 50 is changed so that the innermost page of the pages in the selected state is the top of the pages. The mobile phone 1 displays a text, an image, and the like, on the surfaces of the open pages of the book 50, corresponding to the pages.

Figure 13:
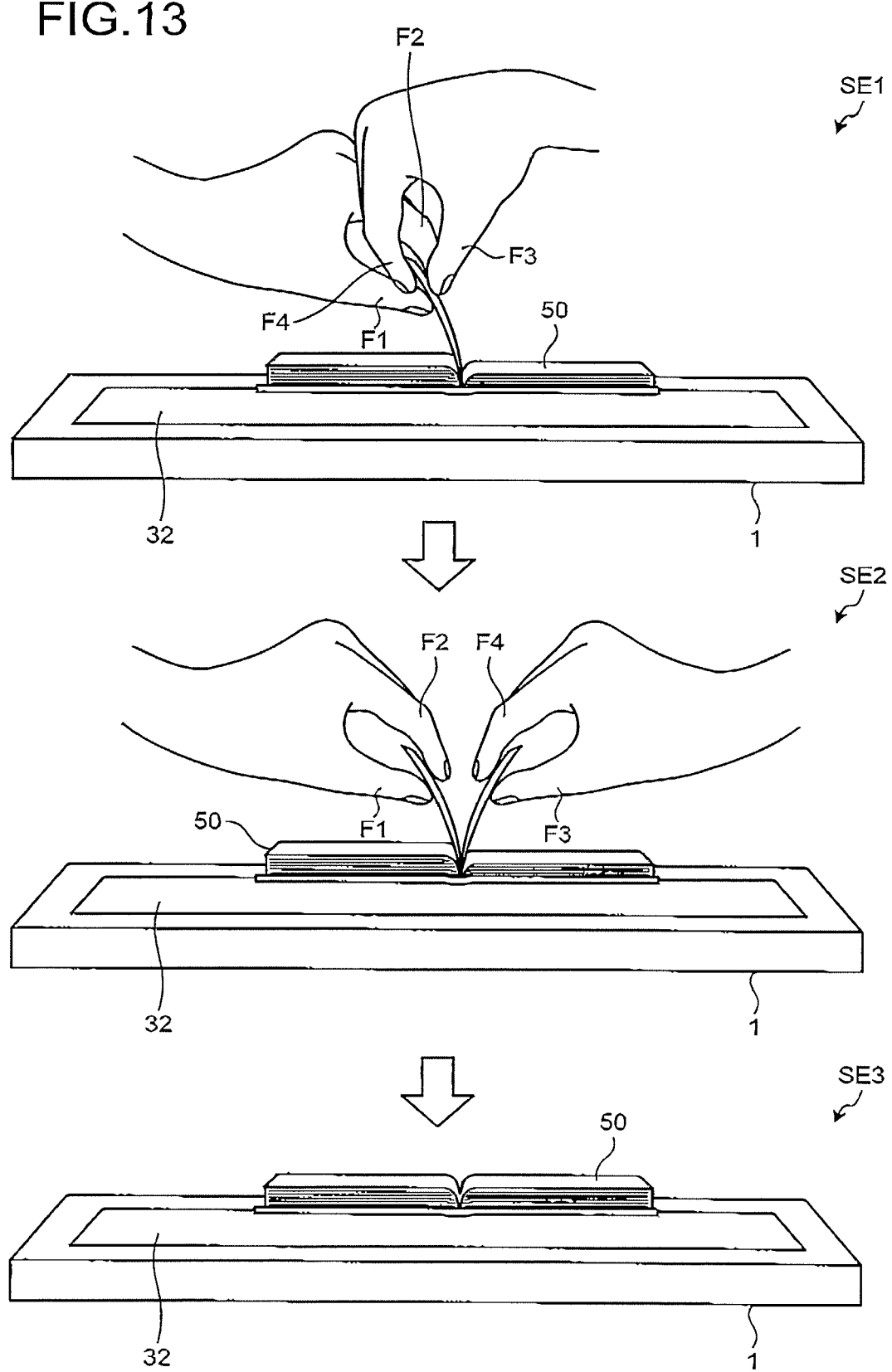
FIG. 13 is a diagram illustrating still another example of how to control page turning.

FIG. 13 is a diagram illustrating still another example of how to control page turning. At Step SE1 in FIG. 13, a plurality of pages are being turned under the control as illustrated in FIG. 12. The user then moves a finger F3 and a finger F4 so that some of the pages in the selected state are located between the finger F3 and the finger F4. When it is detected that the pages are located between the finger F3 and the finger F4, the mobile phone 1 associates the pages located between the finger F3 and the finger F4 with the finger F3 and the finger F4.

Thereafter, at Step SE2, the user moves the finger F3 and the finger F4 in the opening/closing direction of the book 50 until they go across the bound portion of the pages while keeping substantially constant the space between the finger F3 and the finger F4. When such actions of the finger F3 and the finger F4 are detected, the mobile phone 1 changes the pages in the selected state according to the movement based on the action data 24c. Specifically, the mobile phone 1 changes an angle of the pages associated with the finger F3 and the finger F4, of the pages in the selected state, according to the movement of the finger F3 and the finger F4.

When the user increases the distance between the finger F1 and the finger F2 in the state at Step SE2 or when the user moves the finger F1 and the finger F2 away from the bound portion of the pages so that the pages are not located between the finger F1 and the finger F2, the pages between the finger F1 and the finger F2 are released. When the user increases the distance between the finger F3 and the finger F4 in the state at Step SE2 or when the user moves the finger F3 and the finger F4 away from the bound portion of the pages so that the pages are not located between the finger F3 and the finger F4, the pages between the finger F3 and the finger F4 are released. As a result, the mobile phone 1 changes the book 50 according to the movement based on the action data 24c. Specifically, as illustrated at Step SE3, the book 50 is changed so that boundary pages between the pages sandwiched by the finger F1 and the finger F2 and the pages sandwiched by the finger F3 and the finger F4 are respective tops of the both pages. The mobile phone 1 displays a text, an image, and the like, on the surfaces of the open pages of the book 50, corresponding to the pages.

As illustrated in FIG. 11 to FIG. 13, the mobile phone 1 allows the user to pinch page(s) to open the book. As a result, the user not only reads the book by turning page by page from the beginning, but can also easily find out a desired site from electronic publications through an operation similar to an operation performed for an actual book.

Figure 14:
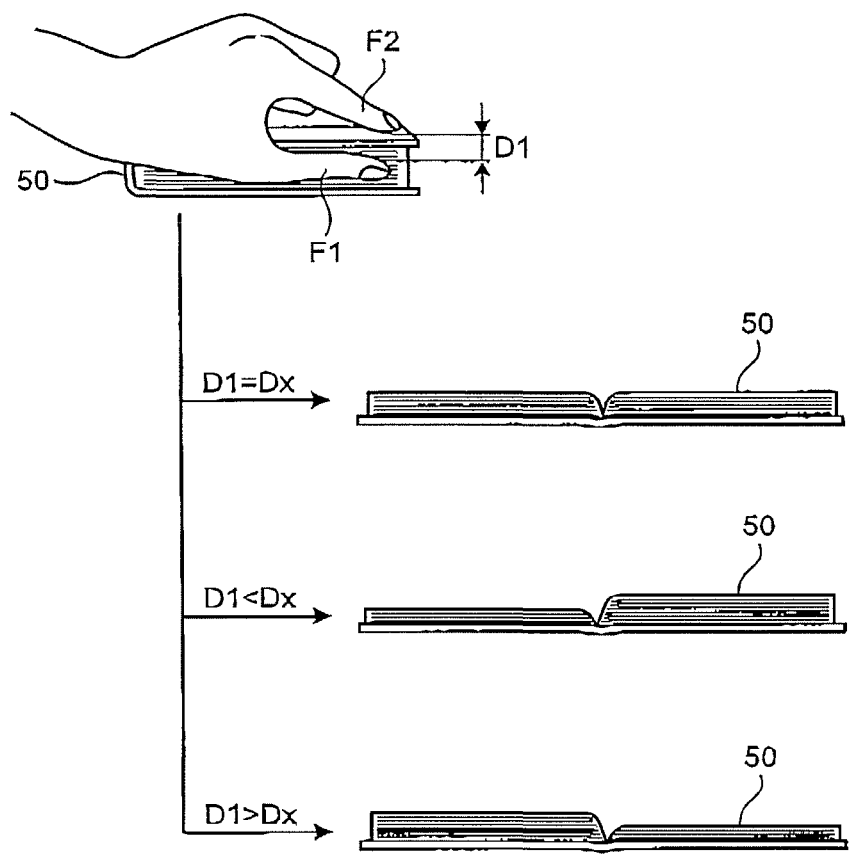
FIG. 14 is a diagram illustrating a relation between the number of pages to be turned and a distance between objects.

The number of pages to be turned is determined according to a distance between the objects that select pages. FIG. 14 is a diagram illustrating a relation between the number of pages to be turned and a distance between objects. As illustrated in FIG. 14, when the distance D1 between the finger F1 and the finger F2 selecting pages is smaller than a distance Dx, the number of pages to be turned becomes less than that when the distance D1 is equal to the distance Dx. Meanwhile, when the distance D1 between the finger F1 and the finger F2 selecting pages is larger than the distance Dx, the number of pages to be turned becomes more than that when the distance D1 is equal to the distance Dx. In this way, the mobile phone 1 increases the number of pages to be turned as the distance D1 becomes larger unless there is a space with the book 50.

In this manner, the mobile phone 1 changes the number of pages to be turned according to the distance D1, and the user can thereby turn an arbitrary number of pages.

When some pages corresponding to the distance D1 are set to be in the selected state and thereafter the distance D1 is changed in a range in which the selection range can be changed, the mobile phone 1 changes the number of pages in the selected state according to the changed distance D1. The mobile phone 1 may show a page-selected range to the user.

Figure 15:
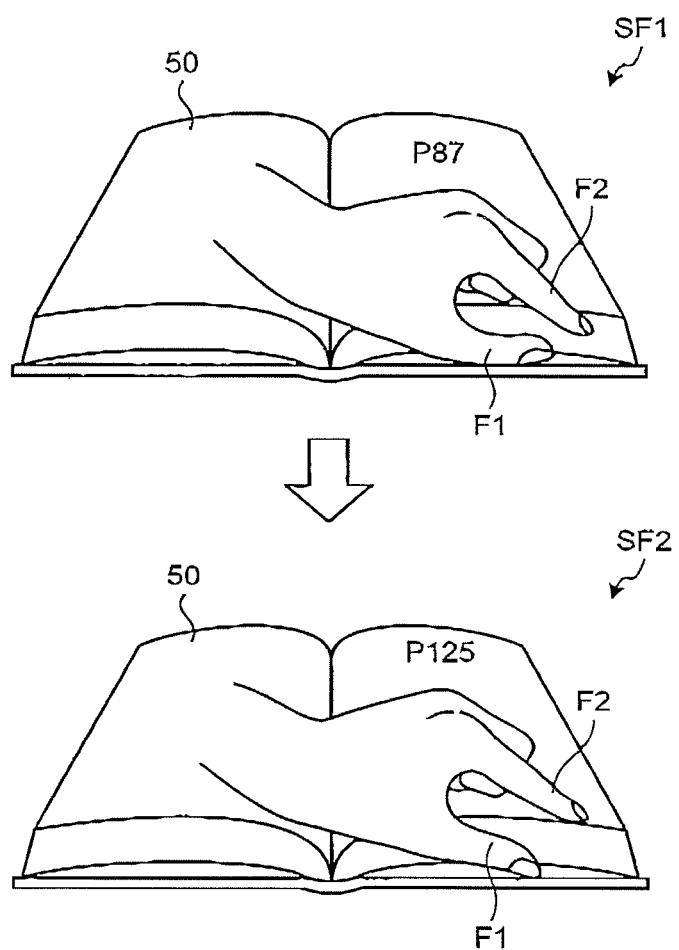
FIG. 15 is a diagram illustrating an example of showing a page-selected range to a user.

FIG. 15 is a diagram illustrating an example of showing a page-selected range to the user. At Step SF1 in FIG. 15, the user moves the finger F1 and the finger F2 so that some pages including the open page are located between the finger F1 and the finger F2. When it is detected that the pages are located between the finger F1 and the finger F2, the mobile phone 1 sets the pages located between the finger F1 and the finger F2 to be in the selected state. Furthermore, the mobile phone 1 displays a page number (87) of the uppermost page, of the pages in the selected state, on the opposite side to the opened page. The example illustrated in FIG. 15 displays the page number on the open page; however, the position where the page number is displayed may be any position if it is seen from the user.

Thereafter, at Step SF2, the user increases the distance between the finger F1 and the finger F2 without forming a space with the book 50. As a result, the mobile phone 1 increases the number of pages in the selected state. Furthermore, the mobile phone 1 re-displays a page number (125) indicating a range of pages in the selected state. In this way, the mobile phone 1 shows the page-selected range to the user, so that the user can easily adjust a range of pages to be turned.

Figure 16:
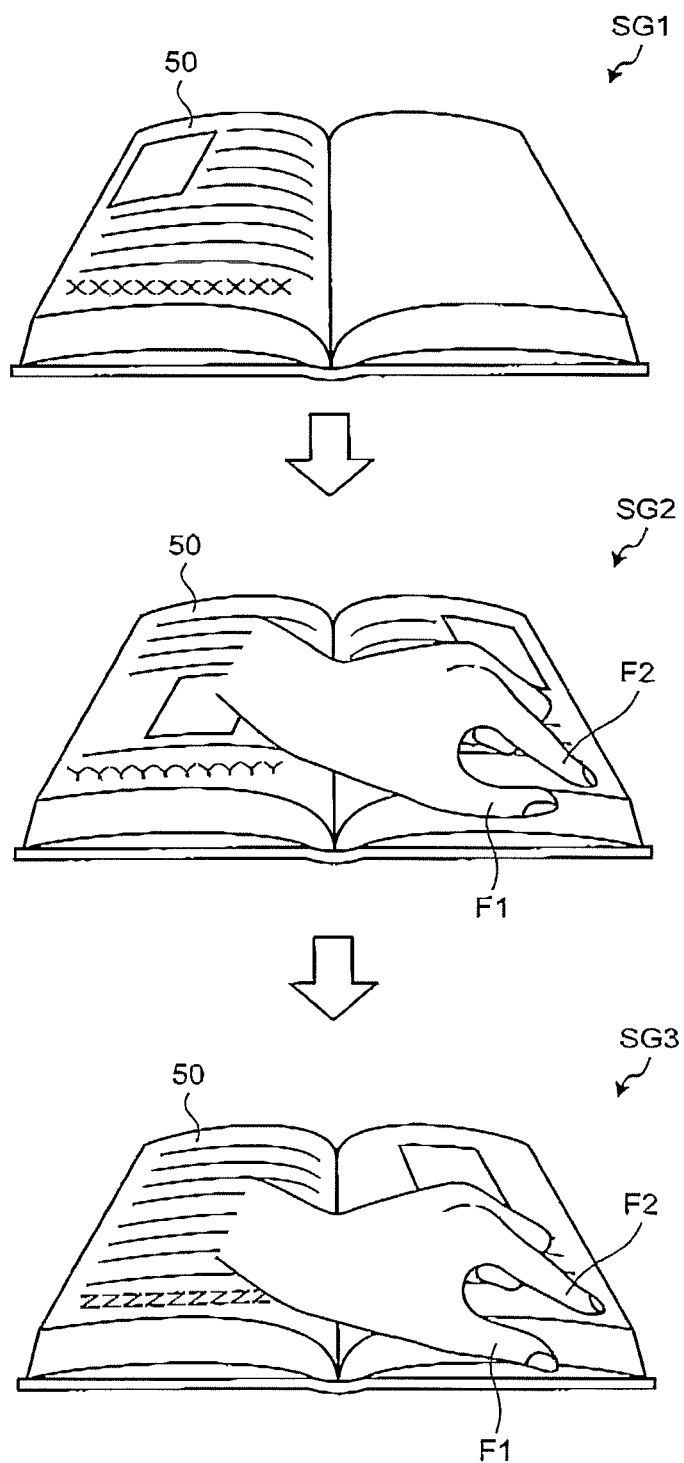
FIG. 16 is a diagram illustrating an example of displaying contents of pages in order to show a page-selected range to the user.

As illustrated in FIG. 15, the page number is displayed in order to show the page-selected range to the user; however, instead of or in addition to the page number, the number of pages or contents of pages in the selected state may be displayed. FIG. 16 is a diagram illustrating an example of displaying contents of pages in order to show a page-selected range to the user.

At Step SG1 in FIG. 16, a text, an image, and the like are displayed, on open pages of the book 50, corresponding to the pages. At Step SG2, the user then moves the finger F1 and the finger F2 so that some pages including the open pages are located between the finger F1 and the finger F2. When it is detected that the pages are located between the finger F1 and the finger F2, the mobile phone 1 sets the pages located between the finger F1 and the finger F2 to be in the selected state. Moreover, the mobile phone 1 displays, on the pages, corresponding text, image, and the like to be displayed after the page in the selected state is turned over. In the example of FIG. 16, the contents of the open pages are replaced; however, the positions and the sizes where the contents of the pages are displayed are simply those that can be seen from the user.

Thereafter, at Step SG3, the user increases the distance between the finger F1 and the finger F2 without forming a space with the book 50. As a result, the mobile phone 1 increases the number of pages in the selected state. Furthermore, the mobile phone 1 displays, on the pages, corresponding text, image, and the like to be displayed after the page in the selected state is turned over. In this way, the mobile phone 1 shows the contents of the pages to the user, so that the user can easily recognize which page can be seen after the turning of the page.

To adjust the number of pages in the selected state, not only the distance between the finger F1 and the finger F2 but also a moving speed of the finger F1 and the finger F2 may be used. Specifically, when the moving speed of the finger F1 and the finger F2 is higher than a threshold, a change amount of the pages in the selected state with respect to a change amount of the distance is increased. Meanwhile, when the moving speed of the finger F1 and the finger F2 is lower than the threshold, the change amount of the pages in the selected state with respect to the change amount of the distance is reduced. Thus, by using the moving speed of the finger F1 and the finger F2, the user can easily adjust the number of pages in the selected state to an intended value. As the moving speed of the finger F1 and the finger F2 mentioned here, it is possible to use a higher one of the moving speed of the finger F1 and the moving speed of the finger F2.

Up to this point, the operation of collectively turning the pages has been explained; however, the mobile phone 1 may accept an operation of turning pages one by one. For example, when an action of moving the fingers or so that touch one of the open pages toward the other page is detected, the mobile phone 1 may turn a page on the side touched by the fingers. This operation resembles an action of turning a page of an actual thin paper.

Figure 17:
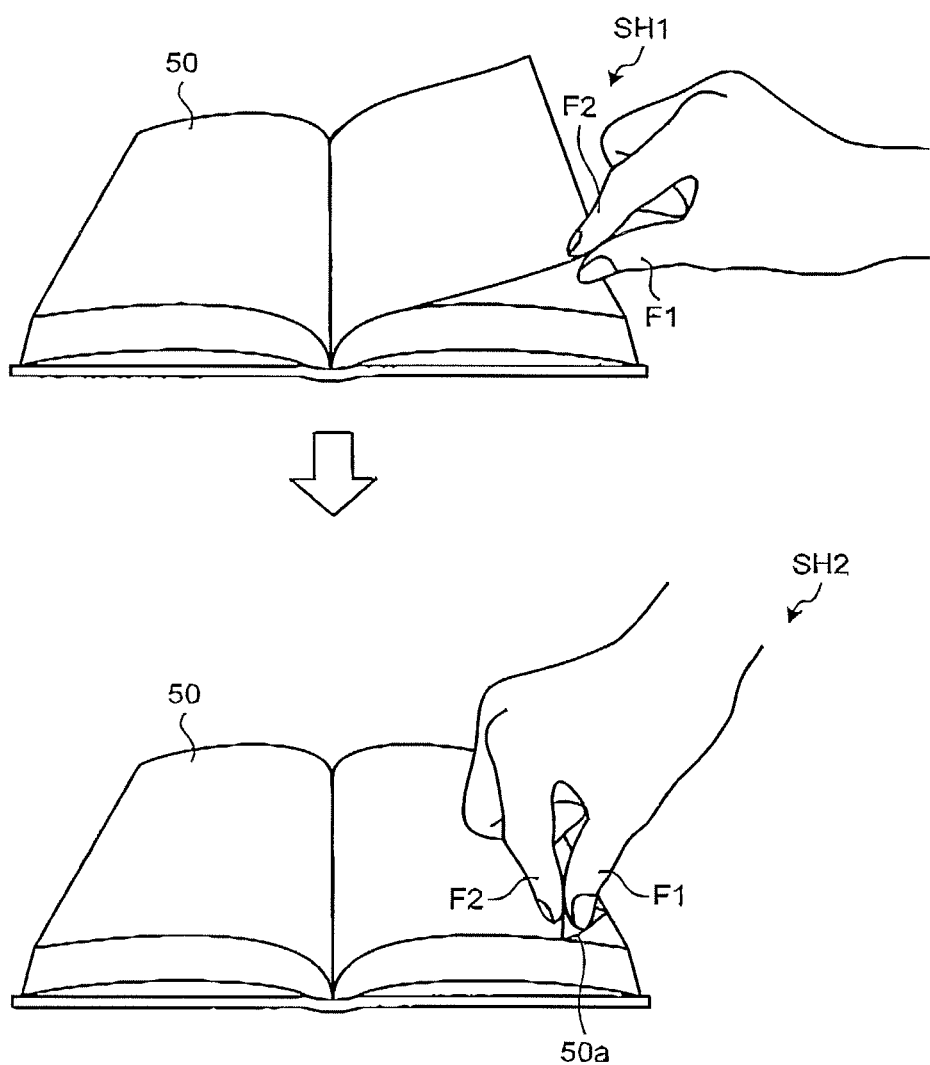
FIG. 17 is a diagram illustrating an example of an operation of putting a mark on a page.

The mobile phone 1 may accept any operation, as an operation for pages, other than the turning operation. For example, the mobile phone 1 may accept an operation of putting a mark on a page, as the operation for pages. FIG. 17 is a diagram illustrating an example of an operation of putting a mark on a page. At Step SH1 in FIG. 17, the user pinches a corner of a page with the finger F1 and the finger F2. At Step SH2, the user moves the finger F1 and the finger F2 as if the pinched portion is tuned up.

Figure 18:
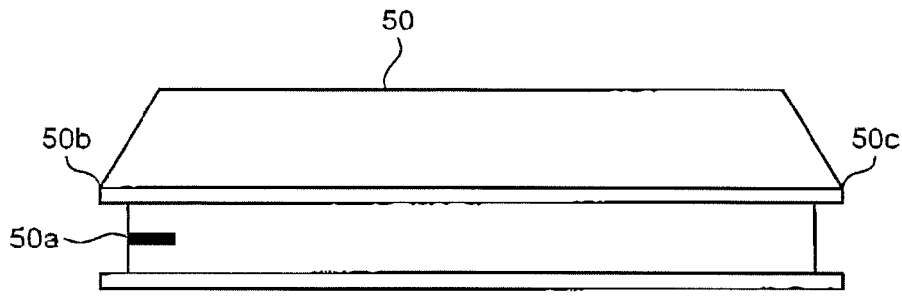
FIG. 18 is a diagram illustrating an example of how to display a fold.

In this way, when an action of turning up part of the page is detected, the mobile phone 1 keeps the portion, as a fold 50a, to be turned up. The mobile phone 1 records the page with the fold 50a in the object data 24b. As illustrated in FIG. 18, the mobile phone 1 may display the fold 50a in a different mode from the other portion by changing, or so, color or brightness so that the user can recognize the position of the fold 50a even if the book 50 is closed. In this way, the mobile phone 1 sets a fold according to user's operation, and the user can thereby put a mark on a page or so which is desired to review afterward.

The fold 50a can be plurally set in one book 50. When the thickness of pages is higher than the threshold (when the rigidity is high), even if an action of turning part of a page is detected, the mobile phone 1 may not set a fold.

Figure 19:
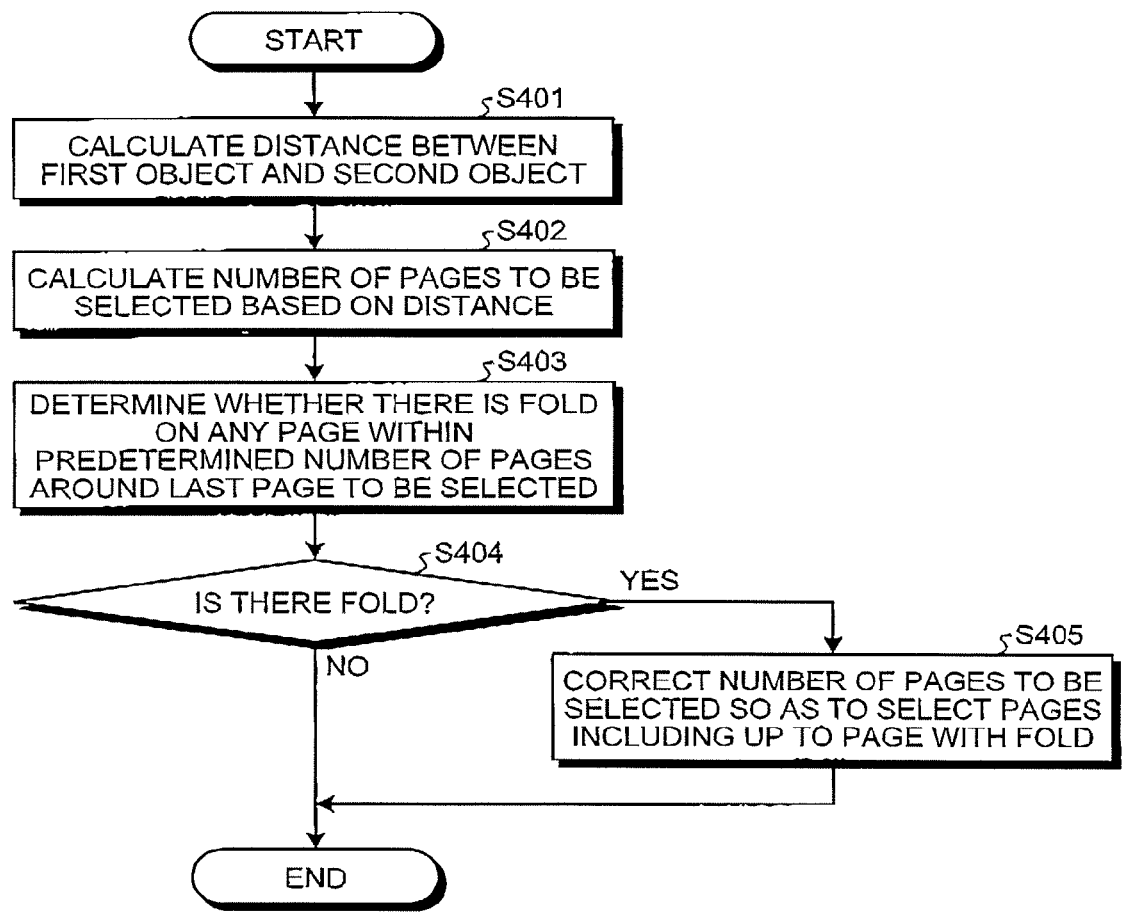
FIG. 19 is a flowchart of an example of a procedure for adjusting a range of pages to be selected.

The mobile phone 1 may adjust a range of pages to be selected so that the user can easily view the page with the fold 50a set thereon. FIG. 19 is a flowchart of an example of a procedure for adjusting a range of pages to be selected. When it is detected that some pages are displayed between the first object and the second object, then at Step S401, the control unit 22 of the mobile phone 1 calculates a distance between the first object and the second object. At Step S402, the control unit 22 calculates the number of pages to be selected based on the calculated distance.

Subsequently, at Step S403, the control unit 22 determines whether there is a fold on any page within a predetermined number of pages around the last page to be selected. When there is the fold (Yes at Step S404), then at Step S405, the control unit 22 corrects the number of pages to be selected so that pages including up to the page with the fold are selected. If there is a plurality of pages with the fold within the predetermined number of pages around the last page to be selected, the control unit 22 corrects the number of pages to be selected so that pages including up to the page closest to the last page pinched are selected.

When there is no fold on any page within the predetermined number of pages around the last page to be selected (No at Step S404), the control unit 22 selects pages based on the number of pages calculated at Step S402.

The adjustment of the selection range as illustrated in FIG. 19 may be implemented only when an operation of pinching a page is performed at an area near the corner, like a corner 50b illustrated in FIG. 18, where the fold 50a is made. Namely, when an operation of pinching a page is performed at an area near the corner like a corner 50c where the fold 50a is not made, the mobile phone 1 may not adjust the selection range. In this way, the mobile phone 1 may restrict adjustment of the selection range depending on a position where a page is selected, and the user can thereby easily refer to pages within the predetermined number of pages around the page where the fold 50a is made.

Figure 20:
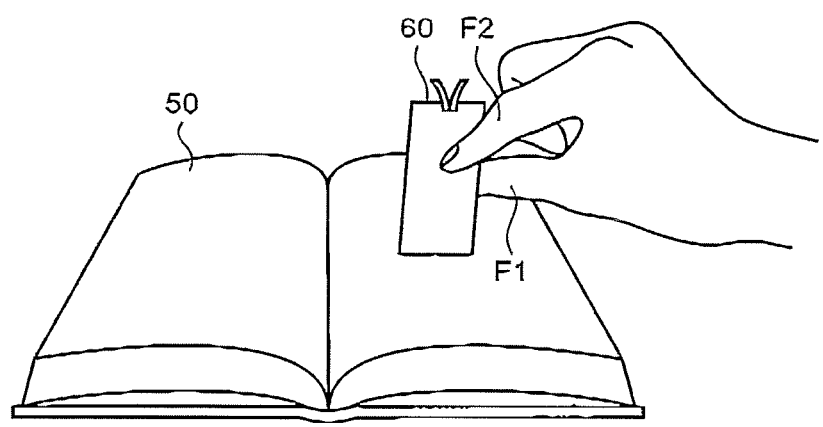
FIG. 20 is a diagram illustrating an example of an operation of slipping a bookmark.

As illustrated in FIG. 20, when an operation of slipping a bookmark 60 in the book or an operation of tucking a spin into the book is detected, the mobile phone 1 may also adjust a range of pages to be selected similarly to the case where the fold is made.

Figure 21:
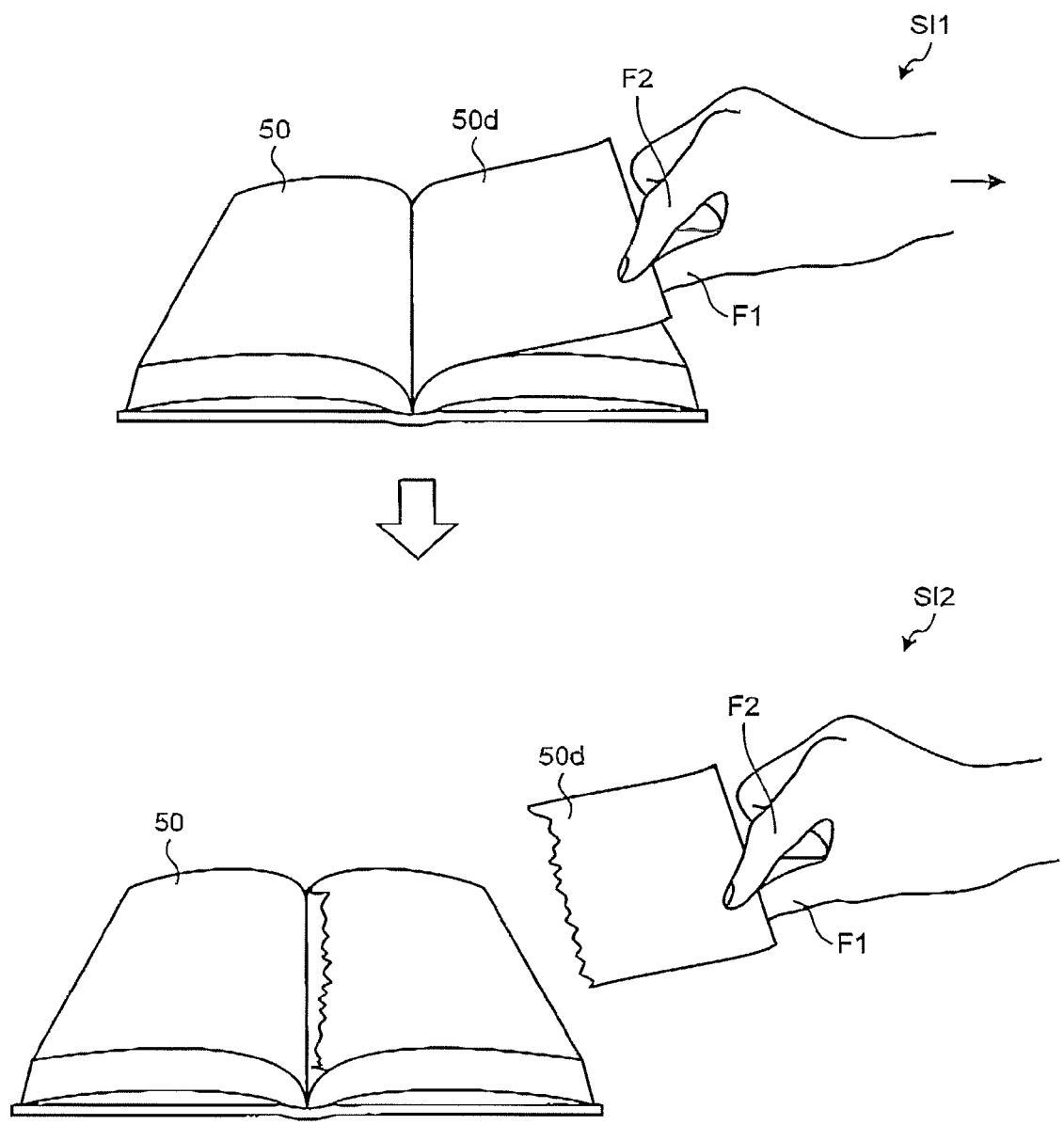
FIG. 21 is a diagram illustrating an example of an operation of cutting out a page.

The mobile phone 1 may accept an operation of cutting out a page as an operation for pages. FIG. 21 is a diagram illustrating an example of the operation of cutting out a page. At Step SI1 in FIG. 21, the user pinches an edge of a page 50d with the finger F1 and the finger F2 to move the finger F1 and the finger F2 so that the distance to the bound portion of the pages is increased. When such actions of the finger F1 and the finger F2 are detected, the mobile phone 1 changes the page 50d according to the movement based on the action data 24c. Specifically, as illustrated at Step SI2, the mobile phone 1 tears the page 50d to be separated from the book 50.

Figure 22:
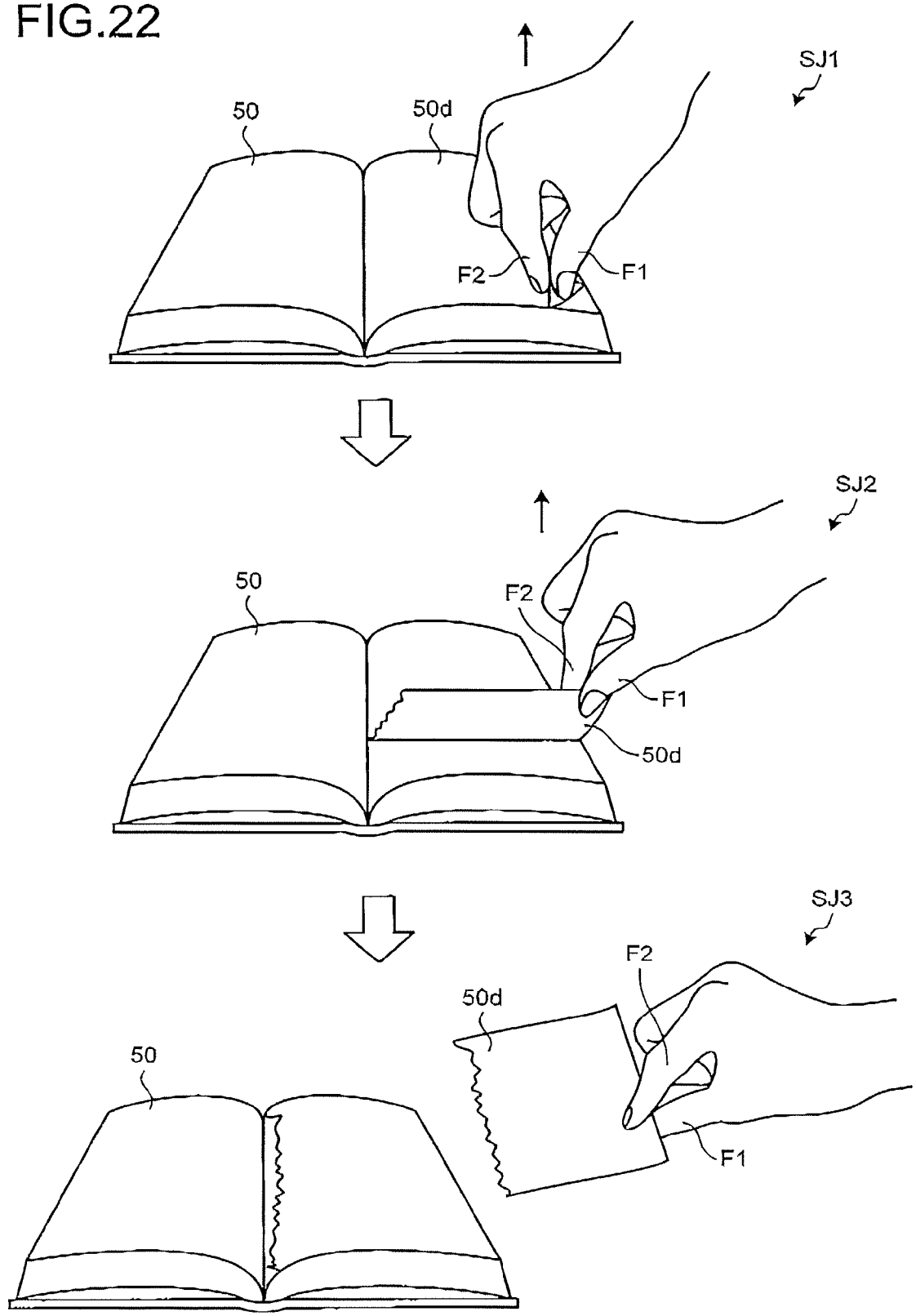
FIG. 22 is a diagram illustrating another example of the operation of cutting out a page.

FIG. 22 is a diagram illustrating another example of the operation of cutting out a page. At Step SJ1 in FIG. 22, the user pinches a corner of the page 50d with the finger F1 and the finger F2. At Step SJ2, the user moves the finger F1 and the finger F2 in a direction perpendicular to the opening/closing direction of the book 50. When such actions of the finger F1 and the finger F2 are detected, the mobile phone 1 changes the page 50d according to the movement based on the action data 24c. Specifically, the mobile phone 1 is tearing the page 50d according to the movement of the finger F1 and the finger F2. As a result, the user continues movement of the finger F1 and the finger F2, and the page 50d is thereby torn to be separated from the book 50 as illustrated at Step SJ3.

Figure 23:
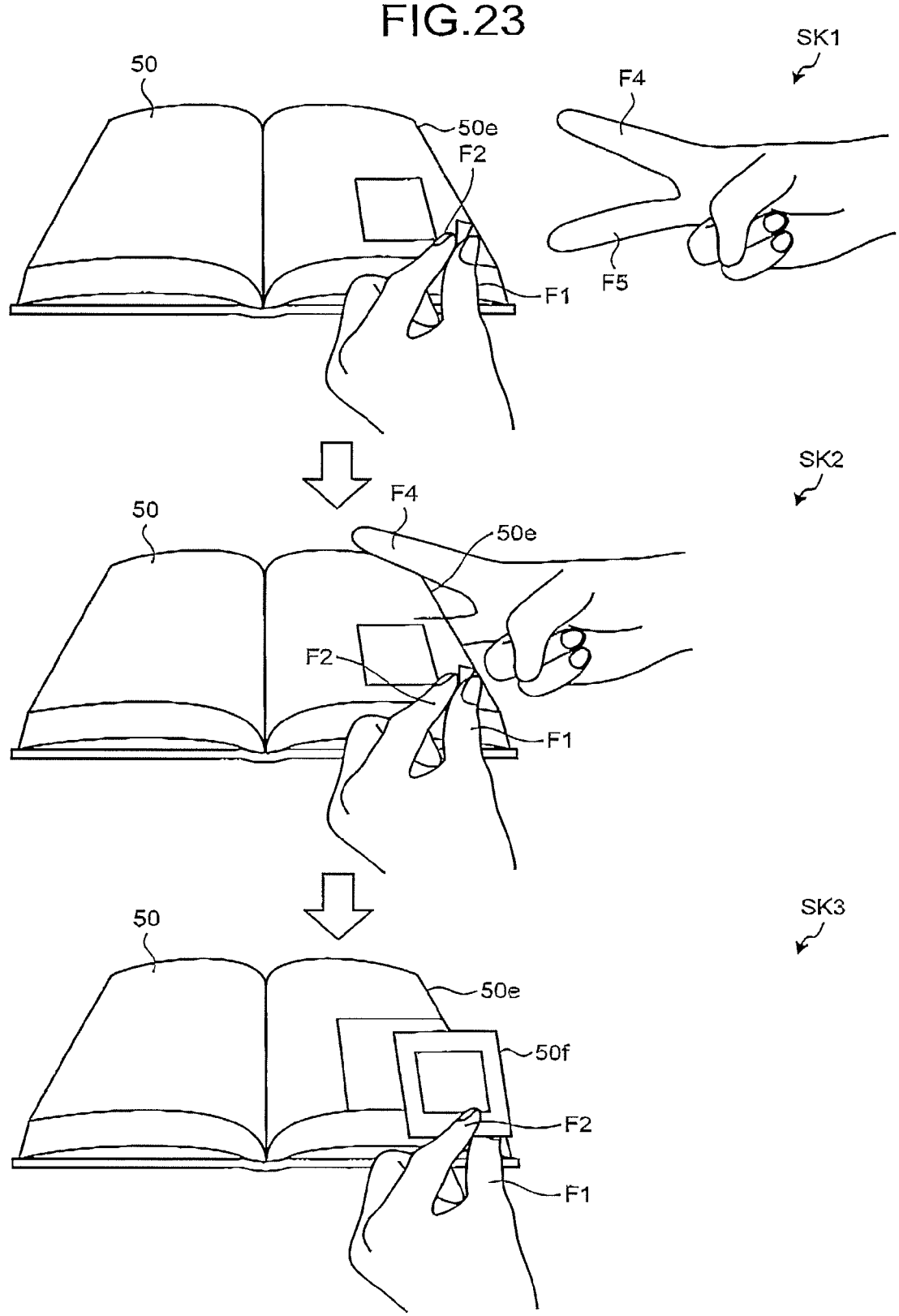
FIG. 23 is a diagram illustrating an example of an operation of clipping part of a page.

FIG. 23 is a diagram illustrating an example of an operation of clipping part of a page. At Step SK1 in FIG. 23, the user pinches a corner of a page 50e with the finger F1 and the finger F2, and forms the finger F4 and a finger F5 of the other hand into scissors. At Step SK2, the user moves the finger F4 and the finger F5 as if they cut across the page 50e. When such actions of the finger F4 and the finger F5 are detected, the mobile phone 1 is making cuts in a portion that is cut across by the finger F4 and the finger F5. As a result, as illustrated at Step SK3, a page piece 50f being part of the page 50e is clipped along a moving path of the finger F4 and the finger F5, to be separated from the book 50. The operation of clipping part of a page is not limited to an action of the fingers formed into the scissors to cut across the page in the above manner. For example, when an action of tracing the page with the finger is detected, the mobile phone 1 may clip a page piece along the traced path.

As illustrated in FIG. 21 to FIG. 23, the mobile phone 1 cuts out the whole or part of the page, so that the user can manage pages including texts and so on, in which he/she is interested, in various types of file form different from the book. When the thickness of pages is higher than the threshold (when the rigidity is high), it may be configured so that the mobile phone 1 cannot cut out a page. When an operation of cutting out a page is detected, the mobile phone 1 may separate a duplication of the page from the book instead of tearing the page. In this way, an object in which a page should not be torn may be, for example, a target object in which duplication of the page is inhibited in terms of copyright management.

Figure 24:
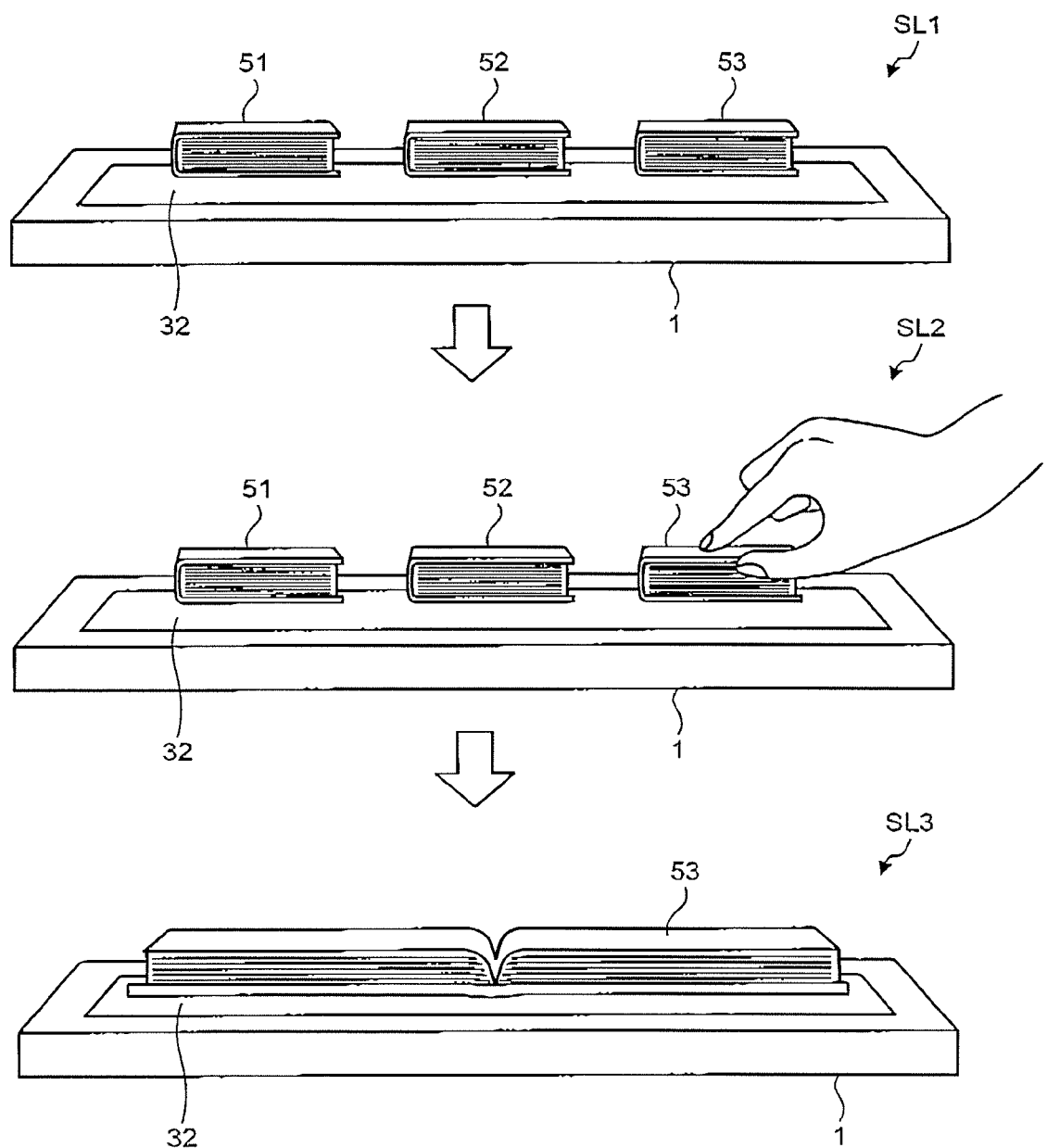
FIG. 24 is a diagram illustrating a control example of a case where a plurality of books are stereoscopically displayed.

The mobile phone 1 can stereoscopically display a plurality of books. FIG. 24 is a diagram illustrating a control example of a case where a plurality of books are stereoscopically displayed. At Step SL1 in FIG. 24, the mobile phone 1 stereoscopically displays three books, books 51 to 53, on the touch panel 32. At Step SL2, the user uses the finger F1 and the finger F2 to perform an operation for opening the book 53.

When the operation of opening the book 53 is detected, the mobile phone 1 opens the book 53 according to the detected operation. At Step SL3, the mobile phone 1 displays the open book 53 in an enlarged manner on substantially the whole surface of the touch panel 32. In this way, by displaying the open book 53 in an enlarged manner, the user can easily view pages of the book 53.

Figure 25:
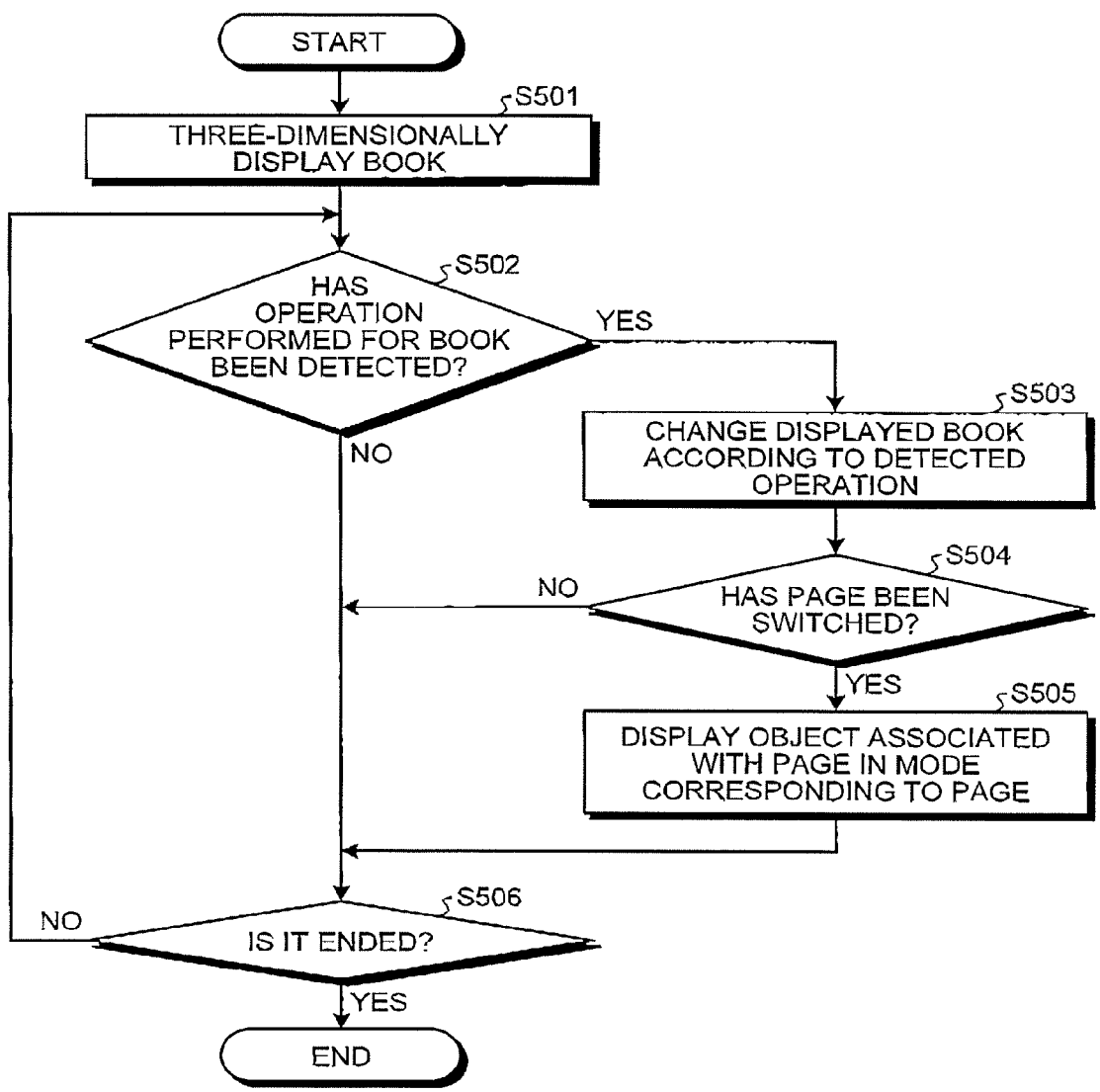
FIG. 25 is a flowchart of a procedure of a process of displaying another object in association with a page.

The mobile phone 1 may display another object associated with a page. A display of another object associated with a page is explained with reference to FIG. 25 to FIG. 33. FIG. 25 is a flowchart of a procedure of a process of displaying another object in association with a page.

The procedure in FIG. 25 is implemented by the control unit 22 executing the control program 24a, for example, when a predetermined operation of instructing activation of the book browsing function is detected by the touch panel 32. As illustrated in FIG. 25, first of all, at Step S501, the control unit 22 three-dimensionally displays a book on the touch panel 32. An appearance and a content of the displayed book are determined based on the object data 24b.

Subsequently, at Step S502, the control unit 22 determines whether an operation performed for the book has been detected. The operation performed for the book is detected based on images photographed by the imaging units 40 and 42. When the operation performed for the book has been detected (Yes at Step S502), then at Step S503, the control unit 22 changes the displayed book according to the detected operation. How to change the book according to the detected operation is determined based on the action data 24c.

Subsequently, at Step S504, the control unit 22 determines whether a page on which a content is displayed has been switched. When the page has been switched (Yes at Step S504), then at Step S505, the control unit 22 displays an object associated with a page on which a new content is displayed, in a mode corresponding to the page.

When the operation performed for the book has not been detected (No at Step S502), the displayed book is kept as it is. When the page has not been switched (No at Step S504), Step S505 is not executed.

Thereafter, at Step S506, the control unit 22 determines whether the process is ended. For example, when the user performs a predetermined operation of instructing an end of the book browsing function, the control unit 22 determines that the process is ended. When the process is ended (Yes at Step S506), the control unit completes the procedure illustrated in FIG. 25. When the process is not ended (No at Step S506), the control unit 22 re-executes Step S502 and the subsequent steps.

In this way, when another object is displayed in association with the page, the mobile phone 1 changes the display of the object in response to switching of the page. A specific example of displaying another object in association with the page is explained below.

Figure 26:
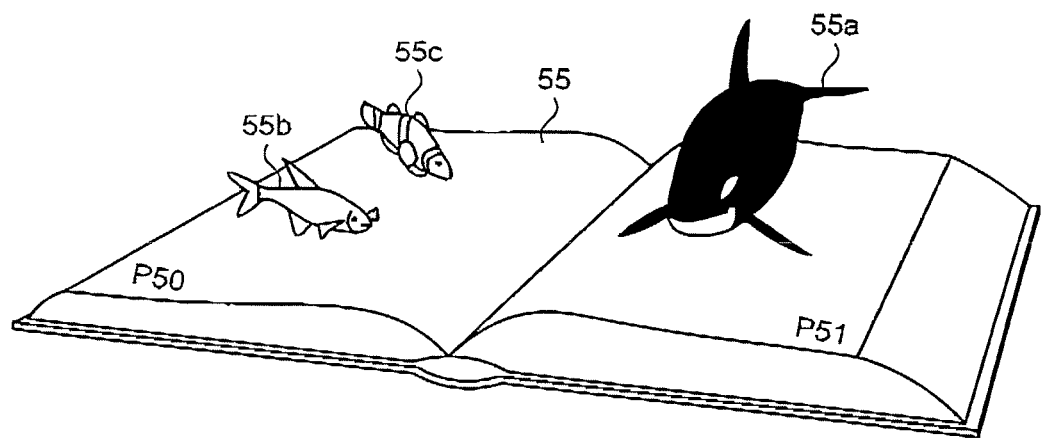
FIG. 26 is a diagram illustrating an example of displaying objects in association with pages.

FIG. 26 to FIG. 29 represent examples of three-dimensionally displaying sea creatures in association with respective pages. In the example of FIG. 26, a three-dimensional object 55a being an orca is associated with a page with a page number 51 of a book 55, and three-dimensional objects 55b and 55c being tropical fishes are associated with a page with a page number 50. When the page with the page number 50 and the page with the page number 51 are displayed, the three-dimensional objects 55a to 55c are displayed thereon respectively in such a manner as if they jumped out of the pages. In this way, by displaying the three-dimensional objects associated with the pages of the book as if they jumped out of the pages, information with more sense of reality than images or illustrations inserted in a real book can be provided to users.

Figure 27:
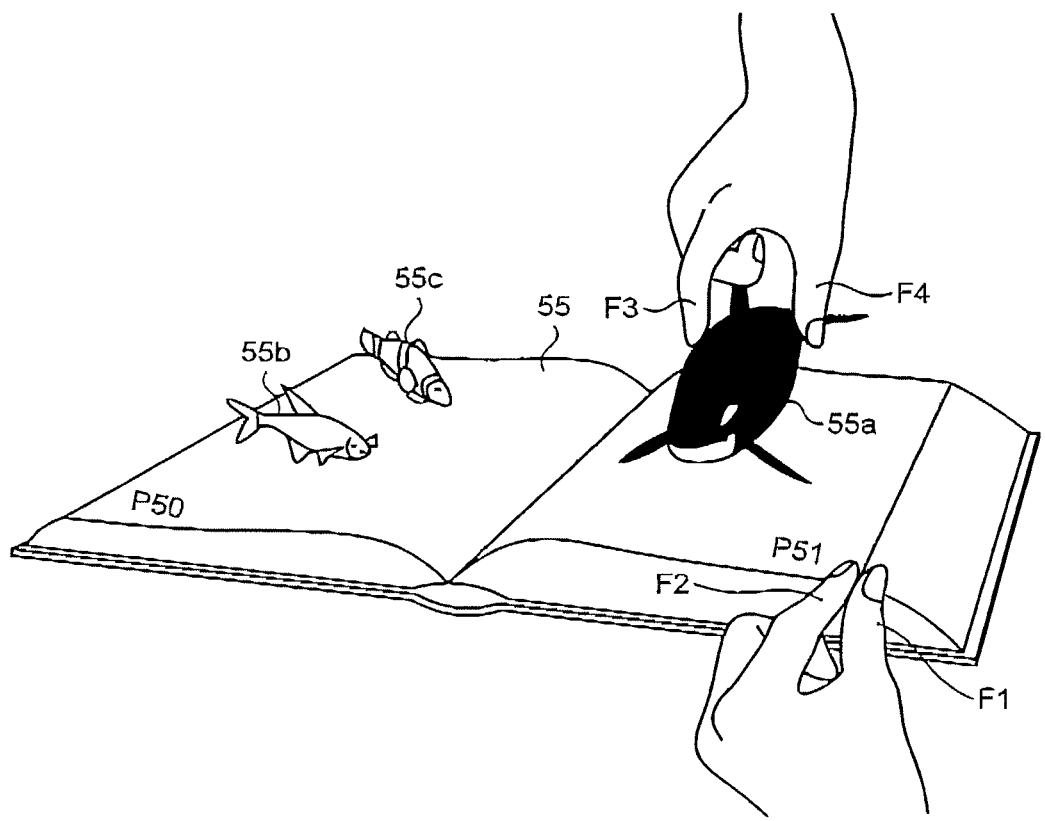
FIG. 27 is a diagram illustrating an example of displaying objects in association with pages.

The user may arbitrarily change a correspondence between the page and the three-dimensional object. For example, as illustrated in FIG. 27, it is assumed that the user turns a sheet of page using the finger F1 and the finger F2 while keeping the three-dimensional object 55a to be pinched with the finger F4 and the finger F5. When it is detected that the page is turned with the three-dimensional object pinched in the above manner, the mobile phone 1 associates the pinched three-dimensional object with a newly displayed page.

Figure 28:
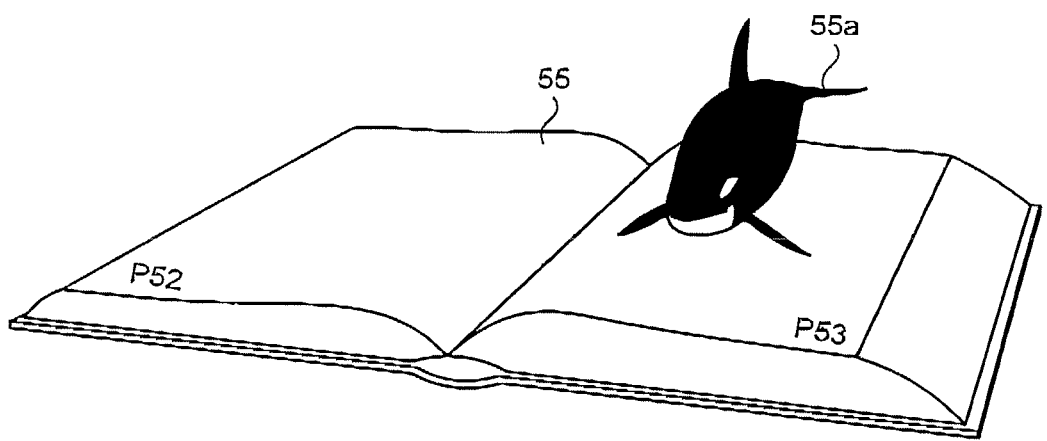
FIG. 28 is a diagram illustrating an example of displaying an object in association with a page.
Figure 29:
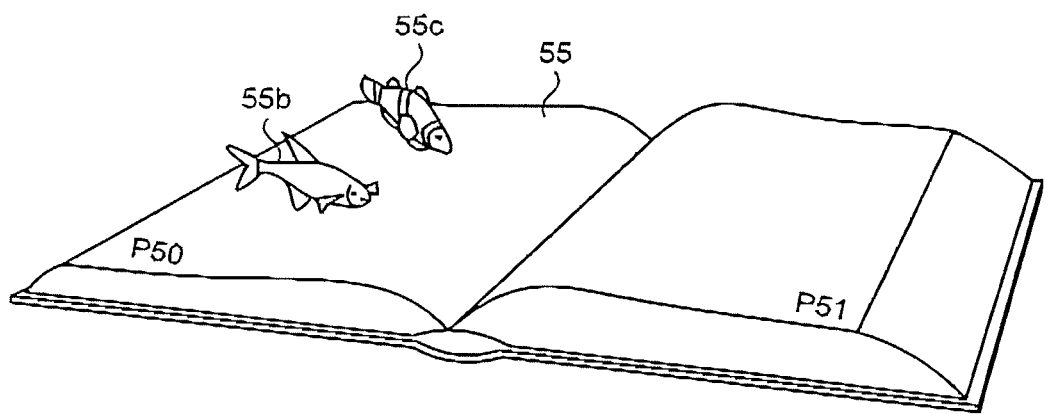
FIG. 29 is a diagram illustrating an example of displaying objects in association with a page.

Consequently, as illustrated in FIG. 28, the three-dimensional object 55a is associated with a page with a page number 53. As illustrated in FIG. 29, when the user turns the page back to display the page with the page number 51, the association with the page is changed, so that the three-dimensional object 55a is not displayed.

In FIG. 26 to FIG. 29, the other objects are associated to one side of the page; however, the other objects may be associated with the front side and the back side of the page. In this case, the mobile phone 1 changes the way to display the object according to an angle of the page.

Figure 30:
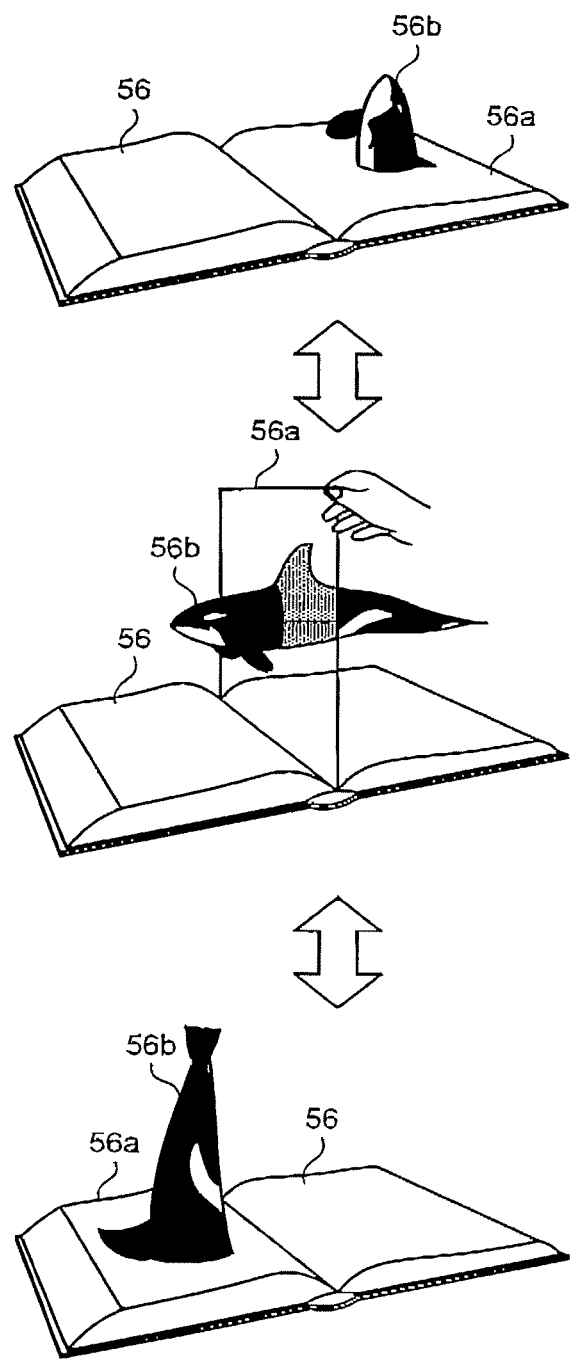
FIG. 30 is a diagram illustrating an example of displaying an object in association with a front side and a back side of a page.

FIG. 30 represents an example of three-dimensionally displaying a sea creature in association with the front side and the back side of a page. In the example of FIG. 30, a three-dimensional object 56*b* being an orca is associated with the front side and the back side of a page 56*a* of a book 56. When one side of the page 56*a* is displayed, the mobile phone 1 three-dimensionally displays the three-dimensional object 56*b* as if an upper body of the orca sticks out from the page 56*a*.

The user then starts turning the page 56*a*, and the mobile phone 1 is increasing a portion to be displayed of the three-dimensional object 56*b* according to the angle of the page 56*a*. At the time when the page 56*a* becomes vertical, the whole of the three-dimensional object 56*b* is displayed. When the user then continues the operation of turning the page 56*a*, the mobile phone 1 is reducing the portion to be displayed of the three-dimensional object 56*b* according to the angle of the page 56*a*. When the page 56*a* is fully turned, the mobile phone 1 three-dimensionally displays the three-dimensional object 56*b* as if a lower body of the orca sticks out from the page 56*a*.

When the user turns the page 56*a* in the opposite direction, the mobile phone 1 changes the three-dimensional object 56*b* inversely with the explanation.

Figure 31:
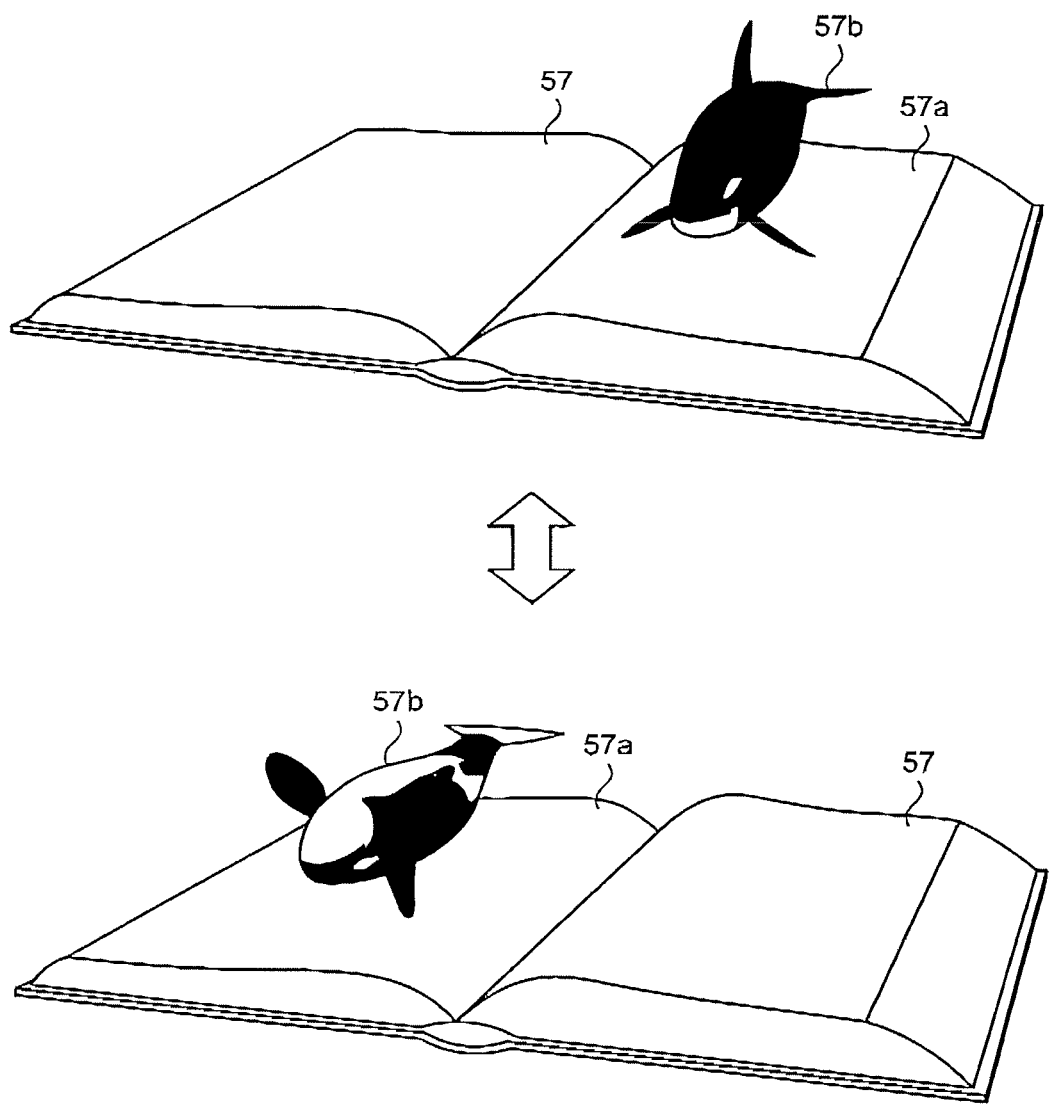
FIG. 31 is a diagram illustrating an example of displaying an object in association with a front side and a back side of a page.

FIG. 31 represents another example of three-dimensionally displaying a sea creature in association with the front side and the back side of a page. In the example of FIG. 31, a three-dimensional object 57*b* being an orca is associated with the front side and the back side of a page 57*a* of a book 57. When one side of the page 57*a* is displayed, the mobile phone 1 three-dimensionally displays the three-dimensional object 57*b* so that a dorsal fin of the orca faces upward.

The user then starts turning the page 56*a*, and the mobile phone 1 is laterally rotating the three-dimensional object 57*b* according to the angle of the page 57*a*. When the page 57*a* is fully turned, the mobile phone 1 three-dimensionally displays the three-dimensional object 57*b* so that the belly of the orca faces downward. When the user turns the page 57*a* in the opposite direction, the mobile phone 1 changes the three-dimensional object 57*b* inversely with the explanation.

In this way, the mobile phone 1 changes the object in association with the page turning, so that the user can change the object in a desired manner through a familiar operation of page turning. Namely, even if the user who is not good at operation of information devices, he/she simply turns a page to enable implementation of a complicated process such as a rotation of a three-dimensional object.

Figure 32:
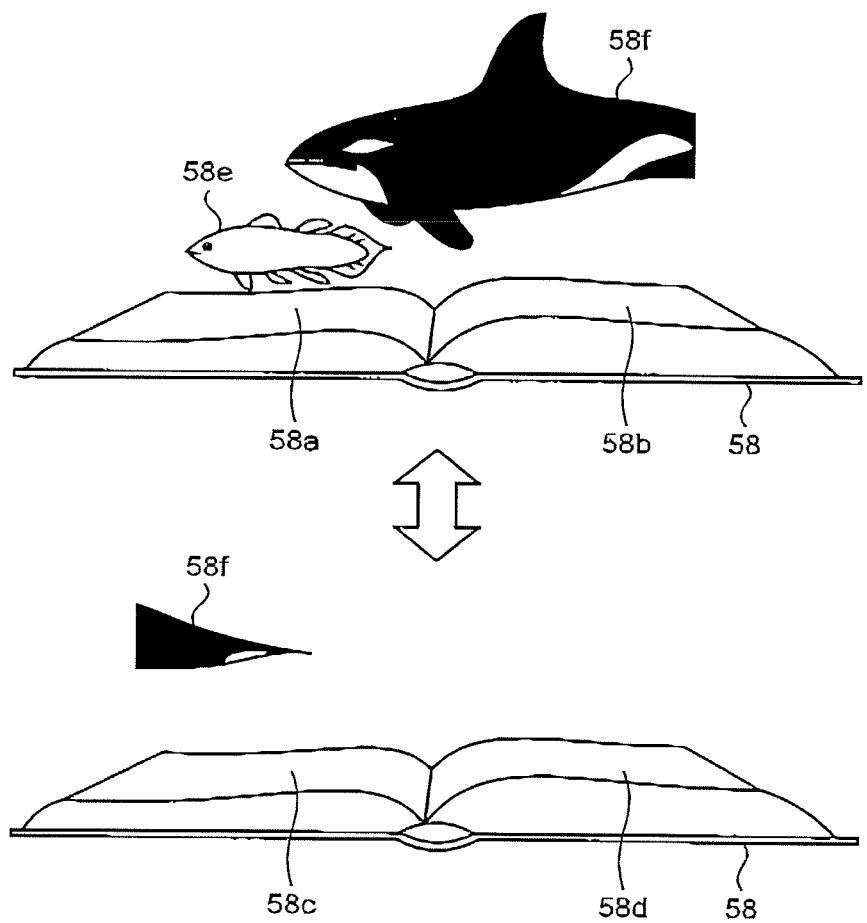
FIG. 32 is a diagram illustrating an example of displaying objects in association with a plurality of pages.

The mobile phone 1 may associate an object with a plurality of pages. FIG. 32 represents an example of three-dimensionally displaying sea creatures by associating the objects with a plurality of pages. In the example illustrated in FIG. 32, a three-dimensional object 58*e* being a tropical fish and a three-dimensional object 58*f* being an orca are associated with four sides such as page surfaces 58*a* to 58*d* of a book 58.

When the page surfaces 58*a* and 58*b* are displayed, the mobile phone 1 displays the three-dimensional object 58*e* and the three-dimensional object 58*f* on the same scale. Because there is a large difference in size between the tropical fish and the orca, when the page surfaces 58*a* and 58*b* are displayed, the caudal portion of the orca sticks out from a visible area, so that the whole body of the three-dimensional object 58*f* cannot be displayed. A portion of the three-dimensional object 58*f* sticking out from the visible area is displayed by turning the page and displaying the page surfaces 58*c* and 58*d*.

In this way, by displaying a plurality of creatures on the same scale, the user can easily recognize a difference in size between the creatures. In addition, the user can view a portion, which sticks out from the visible area and is not therefore displayed, through the familiar operation of page turning.

Figure 33:
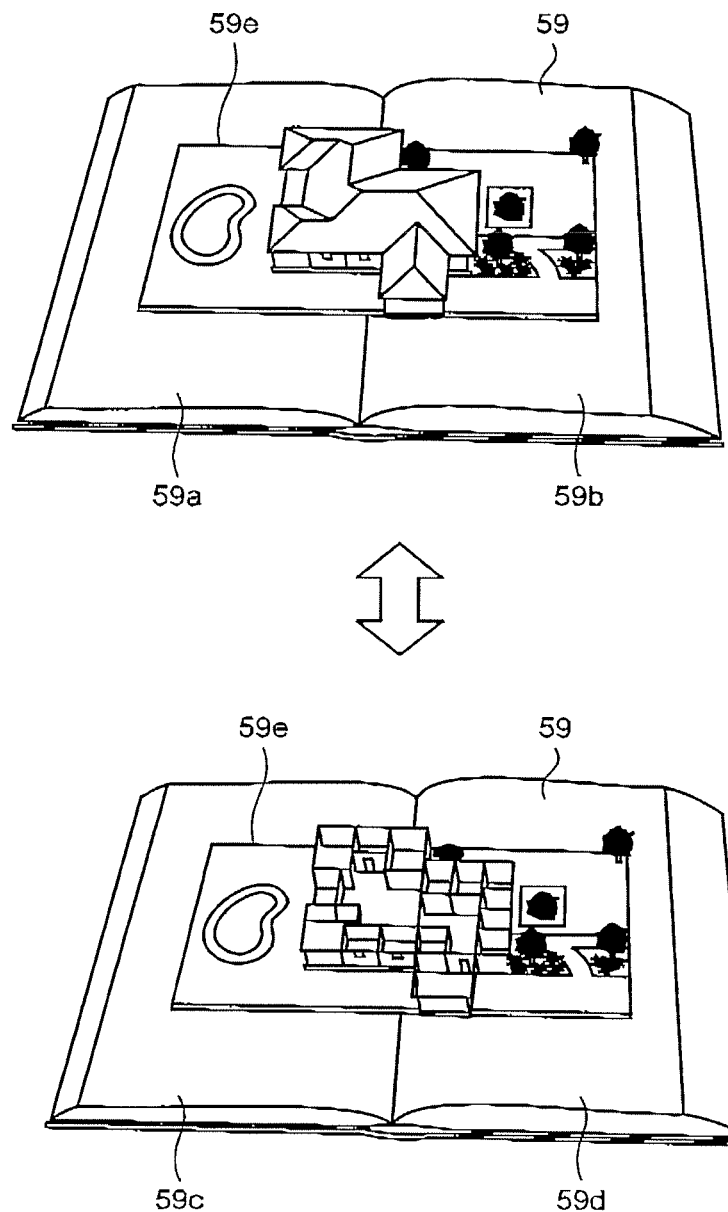
FIG. 33 is a diagram illustrating an example of displaying an object in association with a plurality of pages.

In the example illustrated in FIG. 33, a three-dimensional object 59*e* being a house is associated with four sides such as page surfaces 59*a* to 59*d* of a book 59. When the page surfaces 59*a* and 59*b* are displayed, the mobile phone 1 displays the whole of the three-dimensional object 59*e*. When the page surfaces 59*c* and 59*d* are displayed, the mobile phone 1 displays the three-dimensional object 59*e* so as to display only the first floor of the house.

In this way, the mobile phone 1 can set cross sections according to the number of turned pages and also display an object cut at each of the set cross sections. Such control can be applied to the use for displaying a floor map of a building according to the number of turned pages or to the use for displaying cross sections of a human body according to the number of turned pages.

The aspects of the present invention represented in the embodiments can be arbitrarily changed without departing from the spirit of the present invention. For example, the control program 24*a* represented in the embodiments may be divided into a plurality of modules or may be integrated with any other program. In the embodiments, the fingers are used to operate the three-dimensional object; however, a stick-like object or so of which end is charged with static electricity may be used instead of the fingers.

The embodiments have explained the example of determining the number of pages of the three-dimensionally displayed book to be turned based on a distance between the detected fingers. However, the book whose number of pages to be turned is determined may be a two-dimensionally displayed book. For example, when the touch panel 32 detects that objects, such as two fingers, touch the edge of the two-dimensionally displayed book, the mobile phone 1 may determine the number of pages to be turned if a predetermined page-turning operation is detected afterward, based on the distance between the detected two objects.

The embodiments have represented the three-dimensional object as an example of an object displayed in association with a page. However, the object displayed in association with a page is not limited to the three-dimensional object. For example, a moving image may be displayed in association with a page. When displaying a moving image in association with a page, the mobile phone 1 may reproduce a different chapter each time the page is turned.

The embodiments have described the case where the three-dimensional object projects toward the user side; however, the present invention is also applicable to even a case of showing the three-dimensional object as if it is present in a deeper side than the display unit. In this case, a detector may be provided in the opposite side of the display unit. When the display device is a mobile phone, many mobile phones are provided with an in-camera for photographing the user himself/herself and an out-camera for photographing landscapes and the like. Therefore, it may be configured to capture the displacement of the object in the back side by using the out-camera.

The embodiments are configured that the display device singly detects an operation performed for the three-dimensional object; however, the display device may collaborate with a server to detect an operation performed for the three-dimensional object. In this case, the display device successively transmits information detected by the detector to the server device, and the server device detects the operation and notifies the display device of the detection results. Such a configuration as above enables the load on the display device to be reduced.

The embodiments represent the example of using the imaging units as detectors in order to detect objects to operate the three-dimensional object; however, the detector is not limited thereto. For example, an infrared sensor (including a sensor using a Time-of-Flight (TOF) method) may be used as the detector instead of the imaging units. Alternatively, when a proximity sensor or the like capable of detecting a movement of the three-dimensional object in a planar direction of the three-dimensional space is disposed substantially horizontally with respect to a moving direction of the object, displacement of the object can be detected even in a noncontact manner, and therefore these devices may also be used. It is preferable that the displacement of the object can be detected without providing the sensor or the like in the object by which the three-dimensional object is operated. If the sensor or the like is not provided in the object side, then there is no need to attach an acceleration sensor to the hand or the finger or to move a display device with an acceleration sensor itself, which leads to cost reduction.

The objects operating the three-dimensional object may be detected by using the touch sensor. An example of using the touch sensor as a detector that detects an object for operating a three-dimensional object is explained below. In the following explanation, the same signs as these of the already explained components are assigned to the same components as the already explained components. Explanation that overlaps with the above explanation may be omitted.

Figure 34:
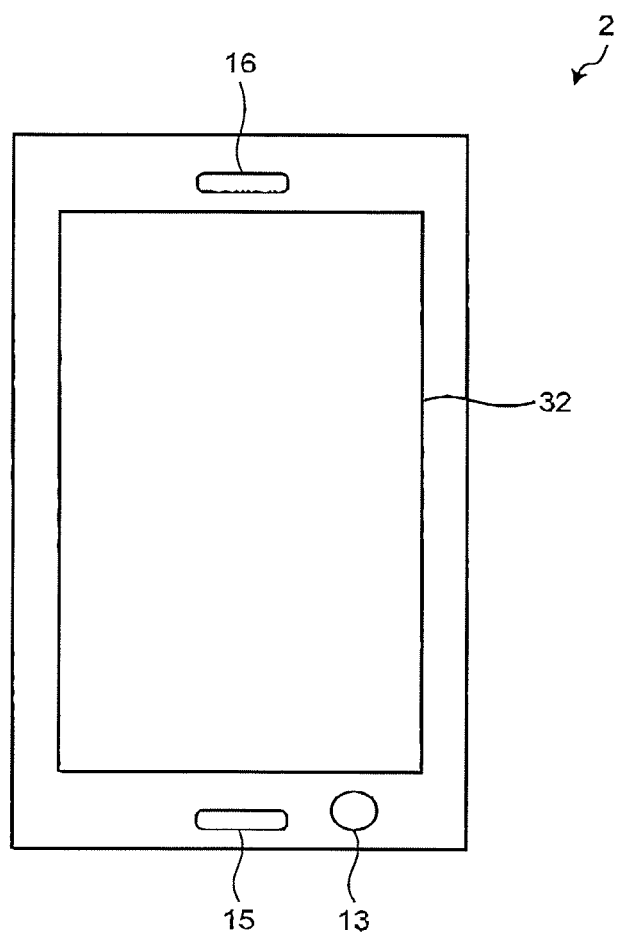
FIG. 34 is a front view of another mobile phone.
Figure 35:
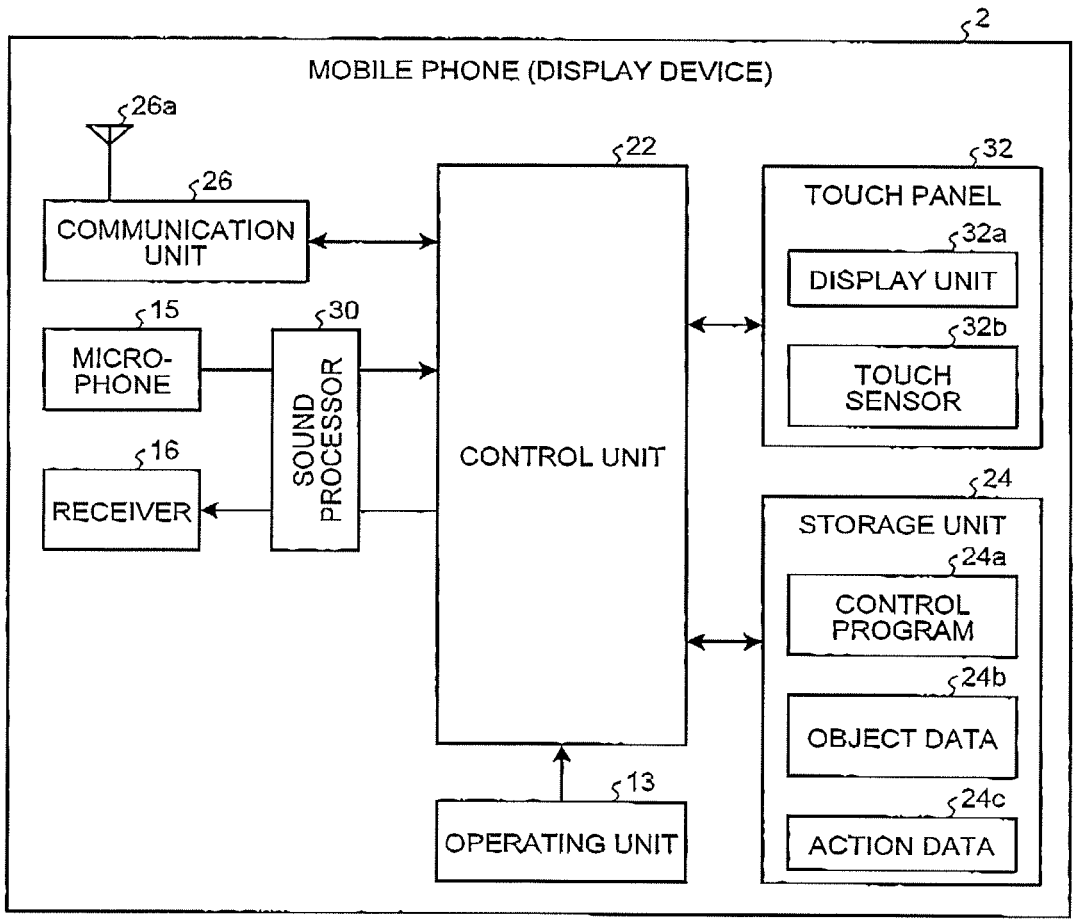
FIG. 35 is a block diagram of the another mobile phone.

First of all, a configuration of a mobile phone (display device) 2 is explained below with reference to FIG. 34 and FIG. 35. FIG. 34 is a front view of the mobile phone 2. FIG. 35 is a block diagram of the mobile phone 2.

As illustrated in FIG. 34 and FIG. 35, the mobile phone 2 includes the operating unit 13, the microphone 15, the receiver 16, the control unit 22, the storage unit 24, the communication unit 26, the sound processor 30, and the touch panel 32.

The touch panel 32 displays various pieces of information such as characters, graphics, and images, and detects an input operation performed for a predetermined area such as displayed icon, button, and character input area. The touch panel 32 is structured with the display unit 32a and the touch sensor 32b so as to overlap each other. The touch sensor 32b according to the present embodiment is a capacitive type touch sensor. The touch sensor 32b functions also as a detector that detects fingers operating a three-dimensional object.

Figure 36:
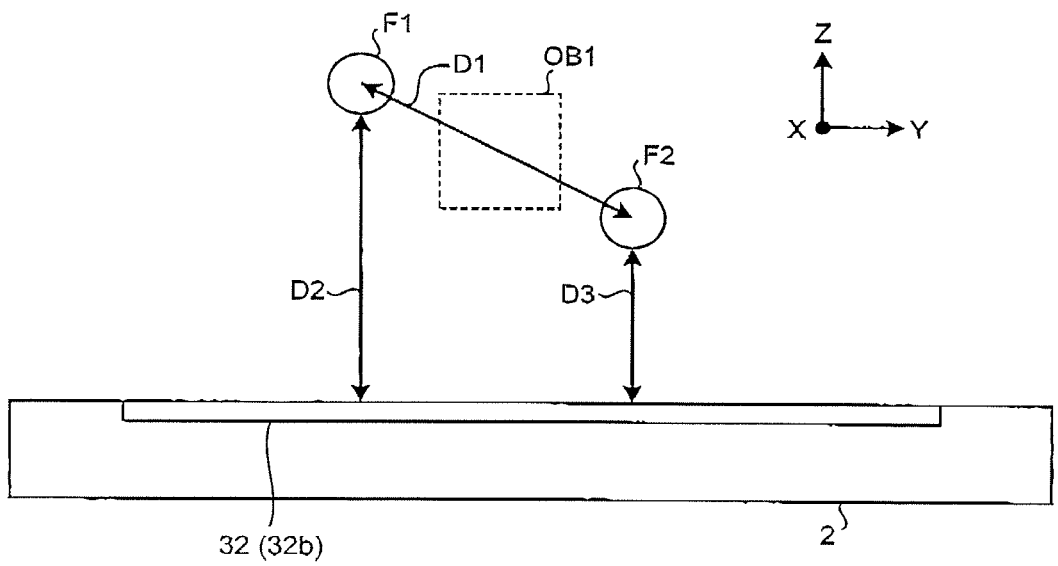
FIG. 36 is a diagram for explaining how to detect an operation performed for the three-dimensional object.

Then, the detection of an operation performed for a three-dimensional object is explained with reference to FIG. 36. FIG. 36 is a diagram for explaining how to detect an operation performed for a three-dimensional object. As illustrated in FIG. 36, the touch panel 32 stereoscopically displays the three-dimensional object OB1 in the three-dimensional space.

It is assumed here that the user wishes to perform some operation for the three-dimensional object OB1. To perform some operation for the three-dimensional object OB1, first of all, the three-dimensional object OB1 has to be selected as an operation object. To select the three-dimensional object OB1, as illustrated in FIG. 36, the user moves the finger F1 and the finger F2 so that the three-dimensional object OB1 is located between the finger F1 and the finger F2.

The mobile phone 2 detects locations of the finger F1 and the finger F2 using the touch sensor 32b. The touch sensor 32b can detect the locations of the finger F1 and the finger F2 in an X-axis direction and a Y-axis direction by increasing its sensitivity even if, for example, a distance between the finger F1 or the finger F2 and the surface of the touch panel 32 in a Z-axis direction is about 10 cm. Moreover, the touch sensor 32b can detect a distance D2 of the finger F1 from the surface of the touch panel 32 in the Z-axis direction and also detect a distance D3 of the finger F2 from the surface of the touch panel 32 in the Z-axis direction based on the magnitude of the capacitance.

The mobile phone 2 can calculate the distance D1 between the finger F1 and the finger F2 and can determine whether the three-dimensional object is displayed between the finger F1 and the finger F2, based on the thus detected locations of the finger F1 and the finger F2 in the three-dimensional space. The control, after the detection of the display of the three-dimensional object between the finger F1 and the finger F2, is executed according to the procedure explained in the embodiments.

As explained above, by using the touch sensor as a detector, the operation performed for the three-dimensional object can be detected even by a display device with no imaging units.

To detect an operation performed for the three-dimensional object, the imaging units and the touch sensor may be used in combination with each other. When the imaging units and the touch sensor are used in combination with each other, respective detection results may be averaged to specify the locations of the finger F1 and the finger F2. Alternatively, a weighted average may be used, the weighted average being obtained by increasing weighting of the detection results of the touch sensor in an area near the touch panel 32 because the imaging units are difficult to acquire images of the finger F1 and the finger F2 and by increasing weighting of the detection results of the imaging units in an area far from the touch panel 32 because the detection precision of the touch sensor becomes low.

Figure 37:
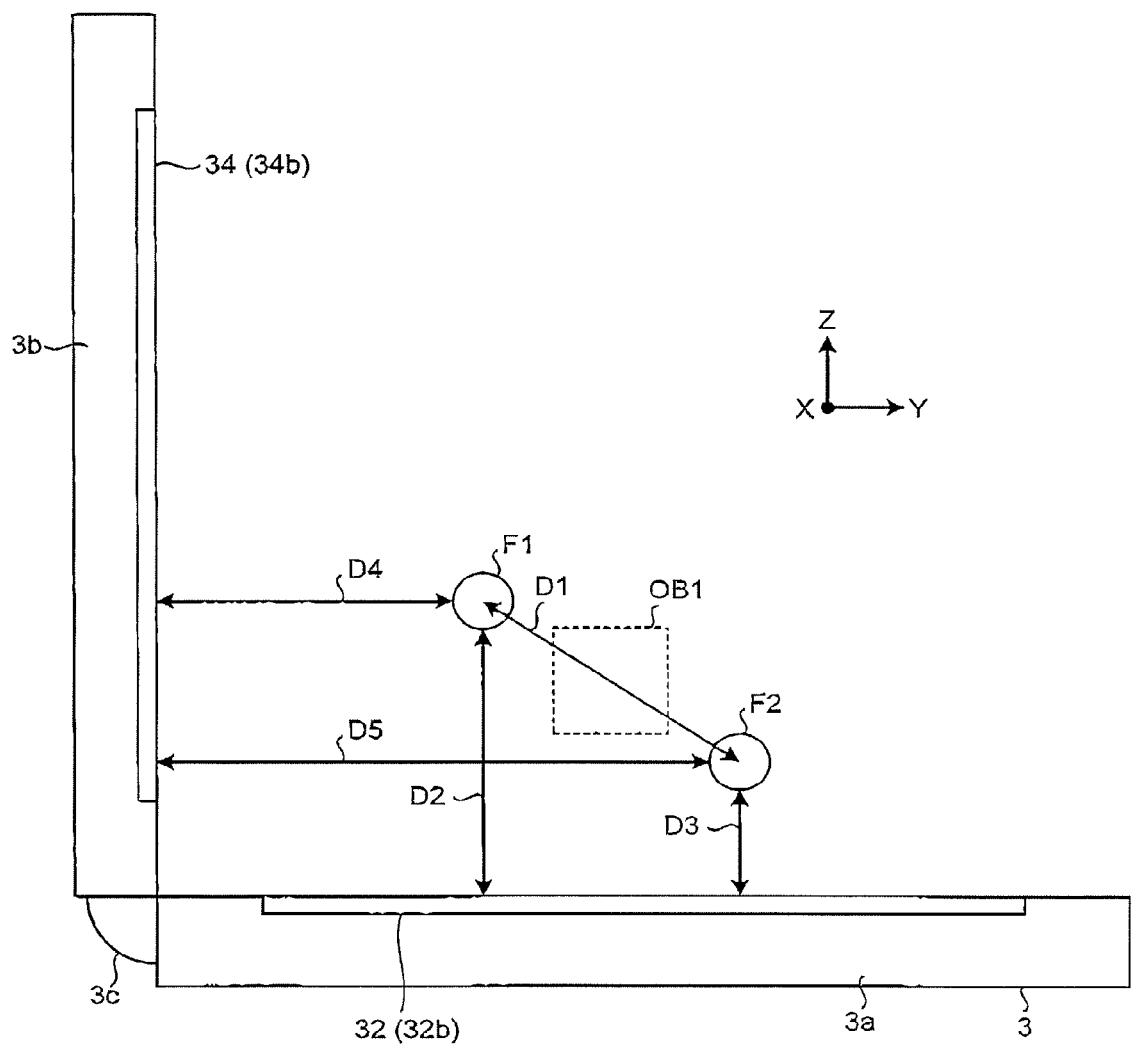
FIG. 37 is a diagram illustrating an example of a configuration of a mobile phone that detects an operation performed for the three-dimensional object using a plurality of touch sensors.

To prevent the touch sensor from not detecting a location of a finger with high precision because some other finger or so may block the finger, a plurality of touch sensors may be used to detect an operation performed for the three-dimensional object. FIG. 37 is a diagram illustrating a configuration example of a mobile phone 3 that detects an operation performed for the three-dimensional object using a plurality of touch sensors.

The mobile phone 3 includes a first housing 3a, a second housing 3b, and a hinge 3c. The hinge 3c couples the first housing 3a and the second housing 3b so as to be opened and closed. The first housing 3a is provided with the touch panel 32 including the touch sensor 32b, and the second housing 3b is provided with a touch panel 34 including a touch sensor 34b. As illustrated in FIG. 37, the touch sensor 32b and the touch sensor 34b face the three-dimensional space at different angles when the first housing 3a and the second housing 3b are fixed to each other at an angle of about 90 degrees.

The touch sensor 32b can detect locations of the finger F1 and the finger F2 in the X-axis direction and the Y-axis direction. The touch sensor 32b can also detect the distance D2 of the finger F1 from the surface of the touch panel 32 in the Z-axis direction and the distance D3 of the finger F2 from the surface of the touch panel 32 in the Z-axis direction, based on the magnitude of the capacitance.

The touch sensor 34b can detect locations of the finger F1 and the finger F2 in the X-axis direction and the Z-axis direction. The touch sensor 34b can also detect a distance D4 of the finger F1 from the surface of the touch panel 34 in the Y-axis direction and a distance D5 of the finger F2 from the surface of the touch panel 34 in the Y-axis direction, based on the magnitude of the capacitance.

In this manner, by detecting the finger F1 and the finger F2 from the different directions, even if there is any obstacle, the locations of the finger F1 and the finger F2 can be detected from either one of the directions. When the finger F1 and the finger F2 are to be detected from the different directions, one of the touch panels displays the three-dimensional object, and the other touch panel may stop displaying or may two-dimensionally display guidance or so. Moreover, the touch panel that stop displaying may be provided with a mere touch sensor.

The embodiments have explained the example of using the present invention to implement the book browsing function; however, an object browsed using the present invention is not limited to the book. The present invention can be used to implement the browsing function of various types of electronic publications including pamphlets and news papers.

The operation performed for the three-dimensional object that can be achieved by the present invention is not limited to the operation explained in the embodiments. For example, an operation of selecting and taking a book off a bookshelf, an operation of folding a news paper, and an operation of writing something on a book or so using a writing material can be implemented by the control according to the present invention.

The advantages are that one embodiment of the invention provides a display device, a control system, and a control program that can provide the user-friendly operations.

What is claimed is:

1. A display device comprising:
    a display unit for displaying a publication;
    a detecting unit for detecting an object that performs an operation of turning a page of the publication; and
    a control unit for causing the display unit to display a display object associated with a page, of pages of the publication, to be displayed according to the operation detected by the detecting unit,
    wherein:
        the control unit is configured to change a display mode of the display object according to an angle of the page corresponding to the display object,
        the display unit is configured to stereoscopically display the publication in a three-dimensional space,
        the detecting unit is configured to detect a plurality of the objects in the three-dimensional space, and
        the control unit is configured to cause the display unit to stereoscopically display the display object such that the three-dimensional object is cut at a cross section according to the angle of the corresponding page.

2. The display device according to claim 1, wherein
    the control unit is configured to cause the display unit to display the display object such that the display object rotates according to the angle of the corresponding page.

3. The display device according to claim 1, wherein
    the control unit is configured to cause the display unit to display a portion of the display object according to the angle of the page corresponding to the display object.

4. A control system, comprising:
    a terminal including
        a display unit for displaying a publication, and
        a detecting unit for detecting an object that performs an operation of turning a page of the publication; and
    a control unit for causing the display unit to display a three-dimensional object associated with a page, of pages of the publication, to be displayed according to the operation detected by the detecting unit,
    wherein:
        the control unit is configured to change a display mode of the three-dimensional object according to an angle of the page corresponding to the three-dimensional object,
        the display unit is configured to stereoscopically display the publication in a three-dimensional space,
        the detecting unit is configured to detect a plurality of the objects in the three-dimensional space, and
        the control unit is configured to cause the display unit to stereoscopically display the three-dimensional object such that the three-dimensional object is cut at a cross section according to the angle of the corresponding page.

5. A non-transitory storage medium that stores a control program for causing, when executed by a display device which includes a display unit, the display device to execute:
    displaying stereoscopically a publication in a three-dimensional space on the display unit;
    detecting an object that performs an operation of turning a page of the publication and a plurality of the objects in the three-dimensional space; and
    causing the display unit to display a three-dimensional object associated with a page, of pages of the publication, to be displayed according to the operation detected by the detecting, wherein
    a display mode of the three-dimensional object is changed according to an angle of the page corresponding to the three-dimensional object, and
    the three-dimensional object is stereoscopically displayed such that the three-dimensional object cut at a cross section according to the angle of the corresponding page.

* * * * *